US006381605B1

(12) United States Patent
Kothuri et al.

(10) Patent No.: US 6,381,605 B1
(45) Date of Patent: Apr. 30, 2002

(54) HEIRARCHICAL INDEXING OF MULTI-ATTRIBUTE DATA BY SORTING, DIVIDING AND STORING SUBSETS

(75) Inventors: Ravi Kothuri, Nashua, NH (US); Siva Ravada, Tewksbury, MA (US); Jayant Sharma; Jayanta Banerjee, both of Nashua, NH (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/322,901

(22) Filed: May 29, 1999

(51) Int. Cl.$^7$ ................................................ G06F 17/30
(52) U.S. Cl. ........................ 707/100; 707/2; 707/4; 707/7; 707/102
(58) Field of Search ............... 707/1–8, 10, 100–104.1, 707/200–205; 709/201, 204, 205, 222–223

(56) References Cited

U.S. PATENT DOCUMENTS

| | | | | |
|---|---|---|---|---|
| 5,404,512 A | * | 4/1995 | Powers et al. ................. | 707/3 |
| 5,647,058 A | * | 7/1997 | Agrawal et al. ............... | 707/1 |
| 5,701,467 A | * | 12/1997 | Freeston ..................... | 707/100 |
| 5,706,503 A | * | 1/1998 | Poppen et al. ............... | 707/100 |
| 5,752,243 A | * | 5/1998 | Reiter et al. .................. | 707/3 |
| 5,781,906 A | * | 7/1998 | Aggarwal et al. ............ | 707/102 |
| 5,905,985 A | * | 5/1999 | Malloy et al. ................ | 707/100 |
| 5,943,668 A | * | 8/1999 | Malloy et al. ................ | 707/3 |
| 5,943,677 A | * | 8/1999 | Hicks ......................... | 707/205 |
| 5,974,407 A | * | 10/1999 | Sacks ........................... | 707/2 |
| 5,978,796 A | * | 11/1999 | Malloy et al. ................ | 707/3 |
| 6,003,036 A | * | 12/1999 | Martin ....................... | 707/102 |
| 6,122,628 A | * | 9/2000 | Castelli et al. ............... | 707/5 |
| 6,182,060 B1 | * | 1/2001 | Hedgcock et al. ............ | 707/1 |
| 6,223,182 B1 | * | 4/2001 | Agarwal et al. ............. | 707/102 |

FOREIGN PATENT DOCUMENTS

| | | | | |
|---|---|---|---|---|
| EP | 0887758 A2 | * | 12/1998 | ................ 17/60 |
| WO | WO-01/04795 A1 | * | 1/2001 | ................ 17/30 |

OTHER PUBLICATIONS

Jurgens, M et al., The R/sub a/*–tree:an improved R*–tree with materialized data for supporting range queries on OLAP data, database and expert systems applications 1998 proceedings, ninth international workshop Aug. 26–28, 1998, pp. 186–191.*

(List continued on next page.)

*Primary Examiner*—John Breene
*Assistant Examiner*—Srirama Channavajjala
(74) *Attorney, Agent, or Firm*—Park, Vaughan & Fleming LLP

(57) ABSTRACT

A system and method for indexing and storing multi-dimensional or multi-attribute data. Data items are recursively sorted in a selected dimension (e.g., the dimension having the greatest variance) and divided until each subdivision fits into a leaf node having a specified fanout. Intermediate nodes and a root node are constructed to complete the index. Each node of the index is stored in a database as a separate object or record and may include a node identifier of the unique, an identifier of a parent and/or a sibling node and an entry for each child of the node, which may be data items or other nodes. Each record entry for a child includes an associated bounding area encompassing descendant data items. Another database table or module may store information about the index, such as the dimensionality of the data, the index fanout and an identifier of a root of the index.

27 Claims, 9 Drawing Sheets

OTHER PUBLICATIONS

Kripendorf, M et al., the translation of star schema into entity–relationship diagrams, database and expert systems applications, 1997 proceedings, eight international workshop, Sep. 1–2, 1997, pp. 390–395.*

Norbert Beckmann, Hans–Peter Kriegel, Ralf Schneider & Bernhard Seeger, The R*–tree: An Efficient and Robust Access Method for Points and Rectangles, Proc. of ACM SIGMOD Int'l Conf. on Management of Data, 1990, 322–331.

Nick Roussopoulos, Stephen Kelley & Frederic Vincent, Nearest Neighbor Queries, Proc. of ACM SIGMOD Int'l Conf. on Management of Data, 1995, 71–79.

Gísli R. Hjaltason & Hanan Samet, Ranking in Spatial Databases, Proc. of the $4^{th}$ Symposium on Spatial Databases, 1995, pp. 83–95.

David A. White & Ramesh Jain, Algorithms and Strategies for Similarity Retrieval, Proc. of SPIE Conf., 1996, 43 pages.

Marcel Kornacker, C. Mohan & Joseph M. Hellerstein, Concurrency and Recovery in Generalized Search Trees, Proc. of ACM SIGMOD Int'l Conf. On Management of Data, 1997, 11 pages.

Scott T. Leutenegger & Mario A. Lopez, The Effect of Buffering of the Performance of R–Trees, Proc. of Int'l Conf. On Data Engineering, 1998, 6 pages.

* cited by examiner

HEIRARCHICAL INDEXING OF MULTI-ATTRIBUTE DATA BY SORTING, DIVIDING AND STORING SUBSETS

Oracle, Oracle Server, and all Oracle Server-based trademarks and logos are trademarks or registered trademarks of Oracle Corporation in the United States and other countries.

BACKGROUND

This invention relates to the field of database management systems. More particularly, a system and methods are provided for indexing multi-dimensional data, storing such data in a relational database management system and efficiently retrieving the data upon demand.

Various methods of managing collections of data (e.g., databases) have been developed since data was first stored in electronic form. From initial systems and applications that simply collected data in one or more flat database files to present sophisticated database management systems (DBMS), different solutions have been developed to meet different requirements. Early solutions may have had the advantage of simplicity but became obsolete for a variety of factors, such as the need to store large—even vast—quantities of data, a desire for more sophisticated search and/or retrieval techniques (e.g., based on relationships between data), the need to store different types of data (e.g., audio, visual), etc.

A database may be considered distinct from a DBMS, in that a DBMS, as the name implies, includes utilities for accessing, updating and otherwise managing or operating a database. As the amount and complexity of data stored in databases has increased, DBMS design and development efforts have increasingly focused upon the ability to organize, store and access data quickly and efficiently. As a result, today's database management systems can be very effective in managing collections of linear information such as inventory, customer lists, etc.

With such linear (or uni-dimensional) data—data that varies in value in a single dimension—determining and maintaining relationships between data elements is relatively easy. For example, one value or data point (e.g., a price, a quantity) can easily be compared to another to determine which is "greater" or which ones match a particular query. The ordinal nature of linear data therefore readily lends itself to basic indexing and subsequent storage, search, retrieval and other data management operations. In particular, the appropriate point for insertion, retrieval or deletion of a data element in a database of linear data may be found with great facility by referring to a table or other data index.

In short, today's database management systems have been designed to manage linear data very effectively. Present database management schemes are still poorly suited, however, for managing data that are multi-dimensional in nature. Geographic data, for example, may be meaningful only when expressed in at least two dimensions (e.g., latitude and longitude) and can thus be considered "inherently" multi-dimensional. Because such data can vary in value in more than one dimension, the relationship between selected geographic points is more complex and, unless a particular reference dimension or other criteria is chosen, one point cannot automatically be considered "greater" or "less" than another. The difficulty in expressing relations among sets of inherently multi-dimensional data makes indexing such data (e.g., for storage and retrieval) more complicated.

Closely related to inherently multi-dimensional data is multi-dimensional data that may also be termed "multi-attribute" in nature. Multi-attribute data may be defined as information that possesses multiple defining characteristics that are not inherently related. For example, sales data may be considered multi-attribute in nature if characteristics such as time of sale, region of sale, salesperson, product sold, type/model of product, etc. are recorded for each sale. This data becomes multi-dimensional or multi-attribute in nature when queries are made or reports are desired that specify range predicates in two or more of the data attributes (e.g., the sales made by Salesperson A during the previous month, the best time of year for selling a particular product). Today's database management systems are, unfortunately, not designed to organize this data in a manner that enhances the ability to retrieve those data items satisfying a particular multi-dimensional query pattern Present techniques for dealing with (e.g., indexing, storing, retrieving) multi-dimensional data often involve attempts to translate the data into a single dimension so that existing systems may be used. These techniques often fail to maintain important spatial relationships, however, thus adversely affecting the ability to respond rapidly to multi-dimensional queries. For example, linear quadtrees and Hilbert R-trees transform multi-dimensional data into a single dimension and then construct B-trees on the linearized data. Although these schemes may be adequate for two-dimensional data, linearizing data having three or more dimensions may result in an unacceptable loss of spatial relationship.

Meanwhile, the number and types of applications that use multi-dimensional and multi-attribute data—such as geographic information systems (GIS) and computer-aided design and manufacturing (CAD/CAM) systems—continue to grow. A GIS application may work with maps or charts in which spatial data are expressed in two or three dimensions (e.g., latitude, longitude and, possibly, altitude). Similarly, in CAD/CAM applications products such as printed circuit boards for computer systems may be designed using rectangular areas or cubic volumes. A person using one of these applications may select an area of interest that contains or intersects one or more elements. The application must be able to accurately identify those elements and allow ready modification of the data.

Multi-media applications, in which audio and visual elements are combined in one database, are another area that can benefit from efficient storage of multi-dimensional data. For example, an element of a graphical image may require multi-dimensional data for accurate representation. In particular, graphic images may be described in terms of numerous spectral characteristics (all or some of which may be inherently inter-related). Thus, in a graphical element that embodies a combination of colors (e.g., some mixture of red, green and blue pixels on a computer display) the different colors of the element may be represented in different dimensions. Each dimension's value could, for example, represent the relative proportion of the corresponding color within the element or the number of pixels within the element that have that color. Accurate representation of this data would allow an application to easily identify elements that similar coloring.

Because effective methods of organizing multi-dimensional data in a DBMS have been generally unknown, applications that use such data have been unable to reap the advantages offered by today's database management systems, especially relational database management systems (RDBMS). Among those advantages are backup and recovery utilities, robust security, and controls allowing concurrent data access. Developers of these applications have had to rely upon other methods of indexing and storing such data.

What is needed then is a method of organizing multi-dimensional/multi-attribute data in a DBMS, particularly a relational DBMS, in order to reap the advantages of sophisticated management controls (e.g., concurrent access to the data) without sacrificing spatial relationships. Advantageously, such a DBMS would provide for efficient organization of the data to facilitate its rapid retrieval. Retrieval of the data may be enhanced by applying an effective buffering technique.

SUMMARY

In one embodiment of the invention a system and methods are provided for storing a hierarchical index of multi-dimensional data in a relational database management system (RDBMS).

In addition to providing for effective management of data that is inherently multi-dimensional (e.g., geographic, multimedia), this embodiment also provides for the storage and management of linear data that has multiple attributes. For example, a database of sales figures may be indexed according to attributes such as product, time, salesperson, geographic region, etc.

In an embodiment of the invention, a set of multi-dimensional/multi-attribute data items is indexed by recursively dividing the data items into smaller clusters until each cluster can be stored (i.e., indexed) in a single leaf node of a hierarchical (e.g., tree-structured) index. In this embodiment, when the set of data items or a subset thereof is too large to fit in a single leaf node, a suitable dimension/attribute in which to divide the data items is selected. The capacity of a node may be specified as a fanout characteristic of the index or may be determined by a parameter of a suitable physical storage device.

A dimension or attribute in which to divide the data may be selected on the basis of which one consists of data item values having the greatest variance or range. Alternatively, a dimension may be selected based upon an expected or specified query pattern. When a dividing dimension is selected, the data items may be sorted in that dimension and then divided into two or more subsets that contain equal or nearly equal numbers of data items. After leaf nodes are constructed for clusters of data items, intermediate and, finally, a root node may be constructed to complete the index.

In one embodiment of the invention, a hierarchical index (e.g., an R-tree index) of multi-dimensional or multi-attribute data may be stored in a database, such as a relational database management system. In this embodiment a first object or table in the database is configured to store information concerning the index (e.g., its dimensionality, fanout) and possibly an identifier (e.g., an address or storage location, a unique node identity) of a root node of the index. A second object or table is configured to store a record or row for each node of the index. The multi-dimensional data items may be stored in one or more objects or tables, in the same or a different database.

In the second object or table, each record for an index node may consist of items such as: a unique identifier of the corresponding node, an identifier of a parent node, an identifier of a sibling node, a measure of the number of children of the node, and an entry for each child. In one embodiment of the invention each child entry includes an identifier of the child, which may be a data item (if the node is a leaf node) or another node. Each record also includes a bounding region or area that encompasses the data item (if the node is a leaf node) or all data items that descend from the node (i.e., all data items below the node that are connected to the node through one or more intervening nodes).

In one embodiment of the invention in which a user's query will likely match (within a range of exactitude) one of a set of known query patterns, the data items may be clustered for indexing in an appropriately corresponding manner. Thus, if one query pattern expresses a particular order of hierarchy between the dimensions/attributes of the data, the data items may be divided and clustered accordingly in order to create an index tailored to providing an efficient response to an actual query. Multiple indexes may thus be created (and stored in a database) for a given set of data items.

DETAILED DESCRIPTION

Figure 1:
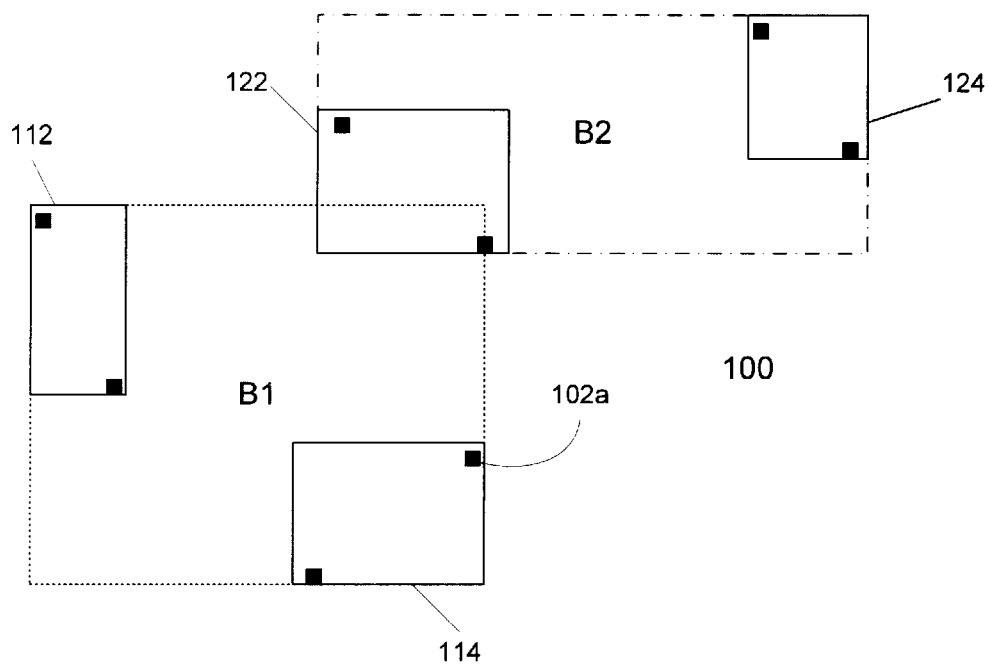
FIG. 1 is a block diagram depicting a set of multi-dimensional data items and one R-tree index that may be constructed to index the data items in accordance with an embodiment of the present invention.
Figure 1:
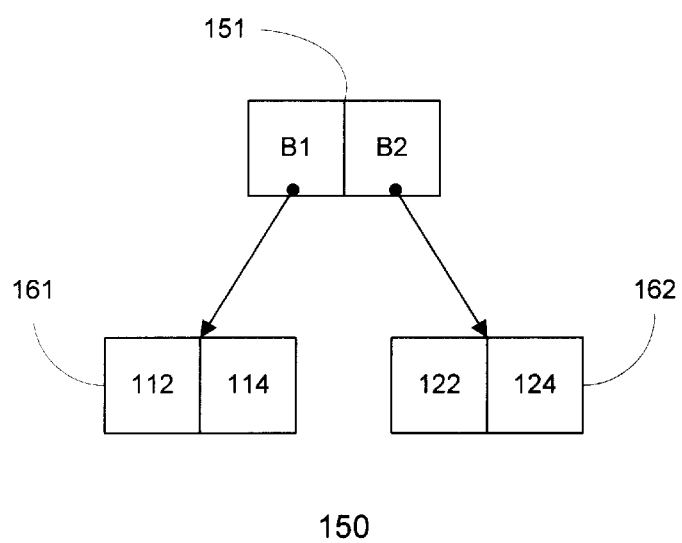

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a hand-held computer. Details of such devices (e.g., processor, memory, data storage and display) are well known and are omitted for the sake of clarity.

It should also be understood that the techniques of the present invention might be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a storage medium such as a carrier wave, disk drive, or computer-readable medium. Exemplary forms of carrier waves may take the form of electrical, electromagnetic or optical signals conveying digital data streams along a local network or a publicly accessible network such as the Internet.

Introduction

A method and apparatus are provided for organizing multi-dimensional data in a relational or object-relational database management system, such as Oracle® Server by Oracle Corporation. In particular, methods and apparatus are provided for indexing multi-dimensional data items in a hierarchical index, storing the index in a database, and performing various operations on the index and/or data items.

Embodiments of the invention described herein may be used to efficiently store, organize, manipulate and retrieve data for applications in the areas of geographical information systems (GIS), computer-aided design and computer-aided manufacturing (CAD/CAM), data warehousing, multi-media, etc. Various types of multi-dimensional data, such as geometrical, geographical, rectangular (e.g., elements of a CAD/CAM project), and geoimage data, plus data representing image, audio and video feature vectors and data possessing multiple attributes, may thus be stored or indexed in a database in one or more embodiments of the invention. In particular, the data items that are indexed and manipulated in an embodiment of the invention may be point data or non-point data (e.g., spatial in nature).

An embodiment of the invention may be installed as an integral part of any database server, whether part of a centralized computing environment, client-server environment or otherwise. The index and/or data may, for example, reside on a client in order to minimize the expense of network activity and access to storage devices. The processing and input/output burdens caused by single/multiple operations on the index may be shared using single/concurrent threads running on single or parallel processor machines operating with single/multiple storage devices.

For purposes of embodiments of the invention described herein, multi-dimensional data may possess any number of dimensions (e.g., two or greater). Multi-dimensional data may also include data that possess multiple attributes or values in multiple dimensions that are not inherently related. For example, geographic data is often expressed in terms of latitude and longitude (or some other coordinate system). Geographic data may thus be considered inherently multi-dimensional because a latitude or longitude value, by itself, cannot adequately identify a geographic feature.

Embodiments of the invention described herein are, however, also effective with data that are not inherently multi-dimensional but which may be accessed or manipulated on the basis of multiple attributes or values. For example, sales data may have attributes such as time (e.g., time of sale), product (e.g., item sold) and area (e.g., region in which a sale occurred). Although sales information may be retrieved using just one of these attributes, reports may be desired that specify range predicates on two or more of these attributes (e.g., all sales of a particular product in a particular region during a specific time period). Although a basic sales data item may not be inherently multi-dimensional, storing or indexing it so as to facilitate its multi-dimensional manipulation may allow more efficient use of the data. Thus, the term multi-dimensional may be used herein to refer to multi-dimensional and/or multi-attribute data.

Within a particular data dimension or attribute, a hierarchy of selectivities or granularities may be specified. In various embodiments of the invention, one or more indexes may be constructed and stored in a database for a set of data items by choosing different selectivities for one or more dimensions or attributes. For example, a region dimension of sales data may include values for both city and state. A first index may then be constructed on the basis of city-level selectivity in the region dimension and, for example, a year selectivity in a time dimension. Another index may be constructed using state and year selectivities.

R-Trees

One embodiment of the invention provides a method and apparatus for efficiently storing and maintaining an R-tree index in a database management system (DBMS). An R-tree index stored within a database in this embodiment supports virtually all update operations (e.g., addition or deletion of a data item, database reorganization) and query operations, plus other database operations such as backup, recovery, security, etc.

R-trees are often used to index data for applications such as those listed above because the R-tree structure has been found to be more effective for use with multi-dimensional data than many alternatives. An R-tree may index data having almost any number of dimensions but in order to provide the most efficient response to queries on the indexed data, it may be desirable to limit the dimensionality of the data to the range of two to approximately ten.

Previous methods of storing R-trees often used file-based systems in which an R-tree was stored among several files, external to a database environment. Because the tree is not part of a database in such methods, such solutions preclude the ability to apply standard tools and utilities for database update, retrieval, security, concurrent access, etc. Some attempts have been made to store R-trees within the framework of a database system, but typically did so by storing an R-tree as a binary large object (BLOB) or an external file. With a BLOB, one R-tree node cannot be distinguished from another when accessing or manipulating the R-tree.

Another method of indexing multi-dimensional data involved normalizing the data to a single dimension and then indexing it with a B-tree structure. This solution is inadequate because of the resultant loss of spatial proximity, which can adversely affect the response time for queries.

An R-tree suitable for storage in a database management system in a present embodiment of the invention consists of a root node and any number of leaf nodes, which may be connected to the root through a suitable quantity of intermediate nodes. The number of child nodes that the root or an intermediate node may have, and the number of data items a leaf node may have, is determined by the R-tree's fanout, which is represented herein as M. M therefore denotes the capacity of an R-tree node. M may be any value greater than or equal to two, but for two-dimensional data a suitable value is approximately twenty-five. In general, values for M in the approximate range of ten to fifty work well with various embodiments of the invention.

Each data item indexed in this R-tree, and each region or collection of data corresponding to a subtree within the R-tree, is associated with a minimum bounding area, or MBA, that is defined in d dimensions (where d is the dimensionality of the indexed data) and that encompasses the corresponding data. Entries within a node (for either a child node or a data item) may be of the form <child, MBA>, where child is a pointer to or other identifier of a child node (for an intermediate or root node) or a data item (for a leaf node).

Illustratively, the MBA portion of an entry comprises a definition of a boundary, the scope of which depends upon the type of entity of the associated child. If the child is a node, the MBA encompasses all of the data items within the subtree rooted at the child node (i.e., data items depending from the child node and/or all descendants of the child node). If the child is a data item, then the MBA simply encompasses that data item. The different areas or regions of a dataset represented by different MBAs may overlap.

In an R-tree that stores two-dimensional geographic data or the multi-attribute sale data described above, for example, an MBA may consist of a specification or definition of a two-dimensional shape (e.g., a rectangle) enclosing the points, areas or data associated with a child subtree. The shape may be specified as a set of geographic locations or points which, when connected, define a bounding area. An MBA may alternatively be expressed as a series of intervals or segments, one for each dimension in which the data has an indexed attribute or value. In general, therefore, an MBA may be expressed as a series of arrays or vectors, each array having d numbers or values (where d is the dimensionality of the data).

Depending upon the database management system used to store an R-tree, special data types may be defined for the indexed data. For example, one version of the Oracle® Server database includes one or more data types designed to support geoimages and/or geometric data.

In one embodiment of the invention, each node of an R-tree index includes the following fields, where applicable, prior to storage in a database:

| | |
|---|---|
| Level | Height of the node (e.g., leaf nodes are at level one, their parents are at level two, etc.) |
| Node_id | Unique node identifier |
| Child_count | Number of child entries in the node |
| Sibling | Identifies (e.g., via a pointer) the node's right-hand sibling |
| Parent | Identifies (e.g., via a pointer) the node's parent (primarily used for root nodes that split because of data insertion) |
| Parent_node_id | Node_id of parent node (primarily used for root nodes that split because of data insertion) |
| Entries | Array (of up to M two-part entries), where each entry is of the form <child, MBA> |

Illustratively, the child element of a root or intermediate node entry in the Entries array is an identifier (e.g., a pointer, Node_id, disk location) of a child node. For a data item entry (i.e., a child of a leaf node), the child element is an identifier of an individual data item.

FIG. 1 depicts two-dimensional dataspace 100 containing data items (a first data item is identified by the reference numeral 102a) and a representative R-tree that may be used to index the data in one embodiment of the invention. In FIG. 1, four data rectangles are depicted having reference numerals 112, 114, 122 and 124. The data rectangles may represent areas within a CAD/CAM project, areas of a geographical map, portions of geoimages, collections of sales data expressed in two dimensions, etc.

If R-tree 150 is assumed to have a fanout of two, root node 151 cannot store all four data rectangles, thus requiring leaf nodes 161, 162. In the illustrated embodiment, when constructing R-tree 150 for data rectangles 112, 114, 122, 124, the data rectangles are first clustered into MBAs. Because the four data rectangles may be stored in just two leaf nodes, it is sufficient to create two clusters. Thus, minimum bounding area B1 is defined to include rectangles 112, 114, which are stored in leaf node 161, while MBA B2 is defined to include rectangles 122, 124, which are stored in leaf node 162. Root node 151 thus comprises two entries: <node 161, B1> and <node 162, B2>. Note that the MBAs of R-tree nodes may or may not overlap.

Storing an R-Tree Index in a Relational Database

This section introduces a suitable method and form for storing an R-tree index in a relational database management system in one embodiment of the invention. One skilled in the art will appreciate that by storing an R-tree within a database management system, the R-tree may be manipulated using normal database tools and operations. In particular, because the R-tree exists within the database framework, it receives the benefits of database features such as security, concurrency control, backup and recovery, etc.

In this embodiment three database objects are employed to store an R-tree: an INDEX table, a METADATA table and a Node_id generator. In addition, individual data items (e.g., sales data, geographical coordinates, other multi-dimensional data) may be stored in a separate DATA table (e.g., an object-relational table). The composition of INDEX, METADATA or DATA tables discussed herein may be modified (e.g., by adding or removing columns or attributes), merged or divided to suit a particular application or environment without exceeding the scope of the present invention.

Illustratively, an INDEX table stores the nodes of an R-tree index, while a METADATA table stores information about the R-tree itself (e.g., dimensionality, identity of root node, fanout). In this embodiment, each row of the INDEX table corresponds to a separate node of the R-tree. A Node_id generator (which may be created at the time the R-tree index is created) generates unique Node_ids for nodes of the tree. Besides the Node_id, however, a node or an entry in a table may be referenced or accessed by its Row_id (i.e., the location of the entry on a storage device such as a disk drive, memory, etc.), a pointer or other identifier.

In one embodiment of the invention an INDEX table of a database includes one or more of the following columns or attributes, where applicable, for each node of an R-tree index:

| | |
|---|---|
| Level | Height of the node (e.g., leaves are at level one, their parents are at level two, etc.) |
| Node_id | Unique node identifier |
| Row_id | Location of node in storage device |
| Child_count | Number of child entries in the node |
| Sibling | Identifier of the node's right-hand sibling |
| Parent_node_id | Node_id of parent node (primarily used for root nodes that split because of tree update) |
| Parent_row_id | Row_id of parent node (primarily used for root nodes that split because of tree update) |
| Entries | Array of two-part entries (up to M in size), each entry being of the form <child, MBA> |

An illustrative METADATA table may comprise separate rows for each R-tree index and include the following columns or attributes for each index:

| | |
|---|---|
| Dimensionality | Dimensionality of the index |
| Root | Identifier of the root node in an INDEX table |
| Fanout | Fanout of the R-tree index |

As described previously, nodes and data items may be identified in many different manners—such as by their Row_id, Node_id, a pointer, etc. In particular, the Sibling and Parent columns of an INDEX table and the Root column of the METADATA table may identify nodes by their Row_ids. Also, the child element of an entry in the Entries array of the INDEX table may be a Row_id of a child node or a data item in a DATA table.

In one embodiment of the invention, the size or capacity of leaf nodes and/or other nodes of an R-tree index may be determined by a parameter of the computing environment in which the database is maintained. For example, the capacity may correspond to a page size (or other unit of measure) of a suitable storage device (e.g., disk drive, memory).

Figure 2:
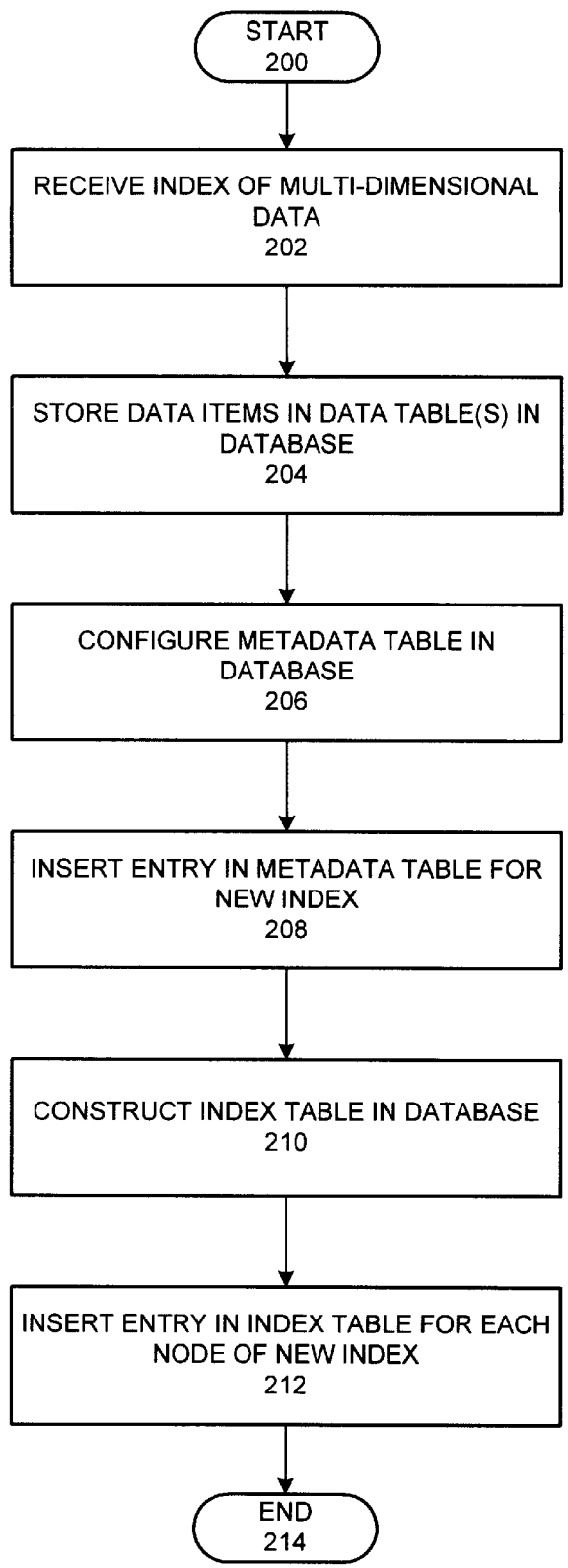
FIG. 2 is a flowchart illustrating one method of storing a hierarchical index of multi-dimensional data in a relational database in accordance with an embodiment of the invention.

FIG. 2 is a flowchart illustrating one method of storing an R-tree index in a relational database system. In FIG. 2, state 200 is a start state.

In state 202, a new index for a set of multi-dimensional data items is received or constructed. The new index may be the only index for the data items or may be one of multiple indexes, possibly constructed according to a different set or order of data dimensions or attributes.

In state 204 the data items are stored in one or more tables in a relational database. The type and configuration of table may depend upon the datatype of the data items.

In state 206 a METADATA table is configured with one or more of the fields described above. This table may already exist (e.g., if another index is already stored in the database) or may be newly generated. In state 208 an entry is stored in the METADATA table for the new index.

In state 210 an INDEX table is constructed to store the nodes of the new index and is configured to include one or more of the fields described above, and possibly other fields as well. In particular, and as described below, in one embodiment of the invention an index node may store data other than that used to construct the index. For example, in an index of multi-attribute sales data each leaf node may store a summary of all sales or profits generated by its individual data item children. Each node above the leaf node level may store aggregations of data items of descendant nodes. Thus, each node stores a summary of sales or profits commensurate with its level in the index. Such summaries or aggregations of non-indexed data may be rapidly reported with having to access individual data items. In state 212 an entry is stored in the INDEX table for each node of the index. The illustrated method then ends with end state 214.

Manipulating an R-Tree Within a Database Environment

This section presents illustrative methods for creating and manipulating an R-tree index within a database system in one embodiment of the invention. One skilled in the art will appreciate that other suitable methods may be applied or may be derived from those described herein without exceeding the scope of the present invention.

Creating an R-TREE Index for Storage in a Database

Various methods of indexing multi-dimensional or multi-attribute data in an R-tree structure are presented in this subsection. Following a discussion of how multi-dimensional data in general may be indexed, a method of indexing multi-attribute data is presented. As explained above, multi-attribute data may be considered a special case of multi-dimensional data. In either case, the resulting R-tree index may be stored in a database using a method discussed in the preceding section. One skilled in the art will appreciate that the methods described in this subsection may be modified and other similar methods developed without exceeding the scope of the invention.

As will be appreciated by those skilled in the art, the present invention may be used to create an index for virtually any type of multi-dimensional or multi-attribute data. In particular, embodiments of the invention are intended for use in indexing non-point data as well as point data.

In one embodiment of the invention a VAMSplit algorithm (extended for polygons by using their centroids) is particularly effective for creating an R-tree index from multi-dimensional data. Other methods of creating an R-tree are disadvantageous for various reasons. A hilbert R-tree algorithm, for example, linearizes the R-tree data, losing spatial proximity in the process, and a tile-recursive algorithm yields poor clustering when the R-tree data is not distributed fairly evenly across the multiple dimensions.

In one effective application of a VAMSplit algorithm, a set of N data points is divided whenever N> M (i.e., there are too many data points to fit in a single node). In order to divide the dataset most equitably, the distribution of data values within each dimension is computed (e.g., the difference between the smallest and greatest values is determined). The data is then sorted in the dimension having the greatest variance and the sorted dataset is then divided in that dimension as close to a median value as possible.

Advantageously, a multi-dimensional data index may allow all desired data to be retrieved in a single query. This is more efficient than invoking multiple queries against uni-dimensional indexes (e.g., and then determining a union of the results).

Figure 3:
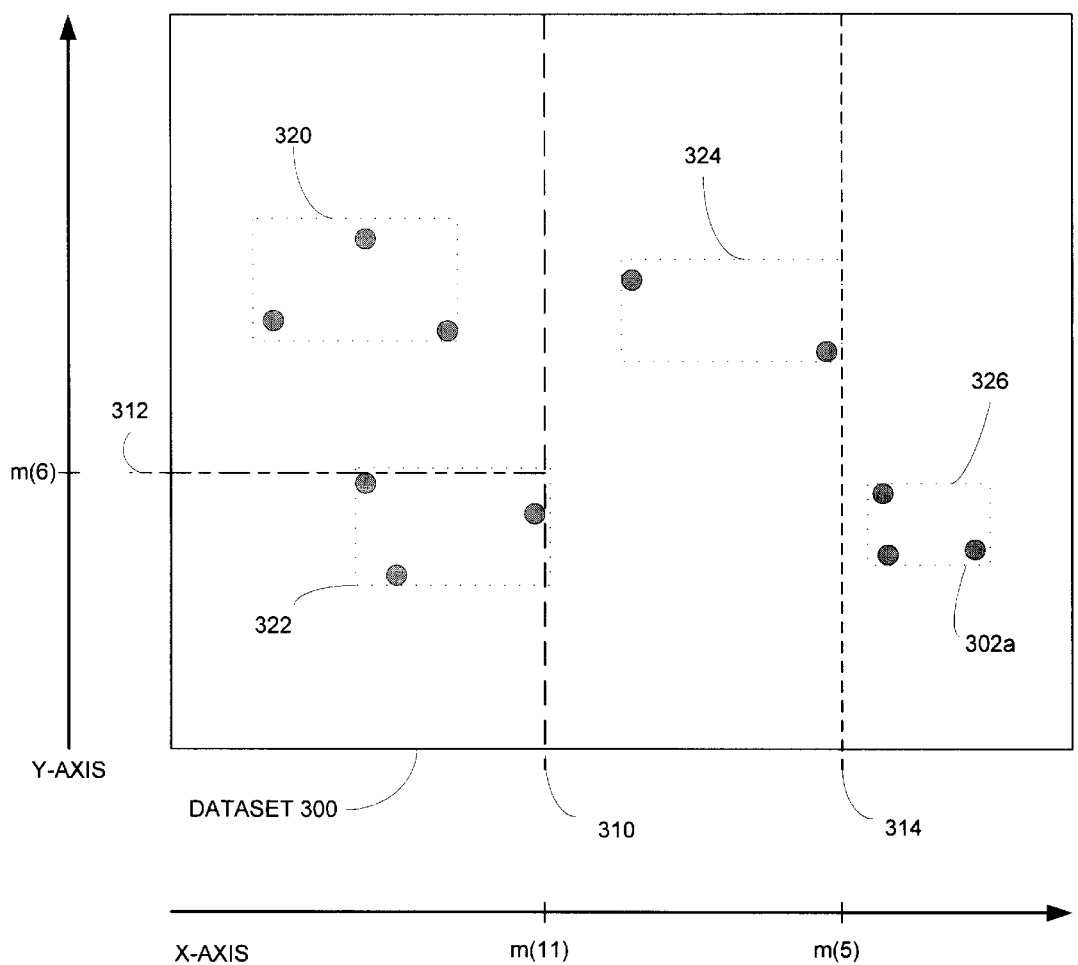
FIG. 3 depicts the division of a set of multi-dimensional data items into clusters, for storage in R-tree leaf nodes, in accordance with an embodiment of the present invention.

FIG. 3 illustrates one method of dividing a set of two-dimensional data points to create an R-tree index according to one embodiment of the invention. For the purposes of FIG. 3, it may be assumed that the fanout, M, for the target R-tree is equal to three. The x- and y-axes may represent any suitable indicia, such as latitude and longitude, color and intensity, etc.

In FIG. 3, dataset 300 comprises multiple data points (a first data point is represented by the numeral 302a) that vary more in the x dimension than the y dimension. They are therefore sorted according to their values in the x dimension and a first division of the data is made at an approximate median, which is illustrated by dividing line 310.

By computing and applying an approximate median value the storage utilization and efficiency for a given R-tree fanout may be maximized. An approximate median, m(N), for N data points may be computed as follows. If the number of data points to be divided is less than twice the fanout value (i.e., N<2*M), an effective approximate median is equal to the floor (i.e., the truncated or rounded down) value of N divided by two (i.e., m(N)=floor(N/2)). Otherwise (i.e., N>2*M), an approximate median may be determined by the equation $$m(N)=M*floor(N/(2*M)+0.5).$$

In FIG. 2, N=11 and, with M=3:

$$m(11)=3*floor(11/(2*3)+0.5)=6,$$

indicating that an effective location for a first division is after the sixth point in the selected (i.e., x) dimension, which is illustrated by dividing line 310.

After the first partition, it is determined whether each new subset of data will fit into a single R-tree node. Each subset that is too large (i.e., each subset that contains more than M data points) is further divided in a similar manner.

Thus, a first data subset (e.g., that which includes values in the x dimension less than m(11)) is further subdivided as follows. This data subset possesses greater variance in the y dimension than the x dimension, and the approximate median (denoted by m(6)) for the subset is computed accordingly. Because N=2*M, $$m(6)=3*floor(6/(2*3)+0.5)=3$$

and the first subset is divided after the third data point in the y dimension. Dividing line 312 illustrates this division.

The second subset (i.e., the subset having values in the x dimension greater than m(11)) yields an approximate median value in the x dimension of 2 (represented on the x-axis by m(5)). In particular, N<2*M, therefore $$m(5)=floor(5/2)=2$$

and the second subset is divided after the second data point. This division is represented by dividing line 314. It will be apparent that each of the approximate median values computed above is relative to the subject dataset or data subset. Thus, the representations of m(11), m(6) and m(5) on the x- and y-axes should be considered relative to the origin or the preceding approximate median value, as appropriate.

After the second subset is divided, each subdivision, or cluster, of data points can now fit into a node of an R-tree having a fanout value of three; therefore no further division is required. Clusters 320, 322, 324, 326 in FIG. 3 are demarcated by dotted boundaries. Now that the data is clustered appropriately, the R-tree index may be constructed by placing each cluster of data items into a separate leaf node (e.g., by placing identifiers of each data item and its storage location or address in the appropriate leaf node). From the leaf nodes, parent nodes may be formed such that each entry in a parent node comprises an MBA of a cluster of data and an identifier of (e.g., a pointer to) the corresponding leaf node. In similar fashion, grandparent nodes of the leaf nodes, and higher nodes as necessary, may be formed. Eventually a root node of the R-tree is constructed.

Figure 4:
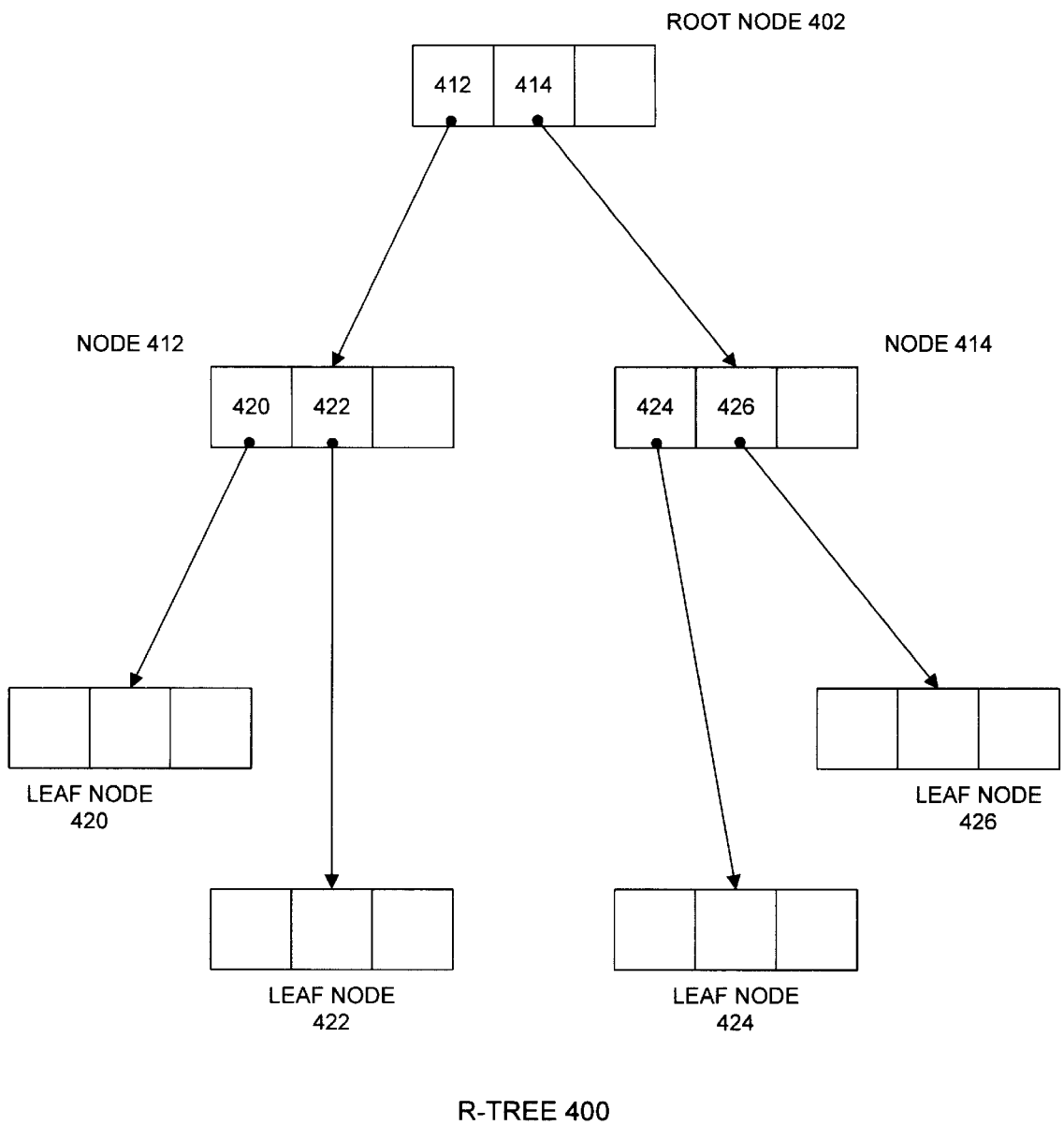
FIG. 4 is one R-tree index that may be constructed from the set of multi-dimensional data items depicted in FIG. 3 in accordance with an embodiment of the present invention.

FIG. 4 depicts R-tree 400, one possible result of indexing dataset 300 of FIG. 3. In FIG. 4, leaf nodes 420–426 are created for clusters 320–326. Because the number of leaf nodes (i.e., four) is greater than M (i.e., three), intermediate nodes 412, 414 are created to index the leaf nodes. Root node 402 is then constructed, with entries for nodes 412, 414. R-tree 400 may be stored in a database by a method described above.

The same approach may be extended to cluster non-point datasets consisting of polygons and other spatial data. Illustratively, for such non-point data the centroids of the data items are used to divide the dataset and cluster data items into leaf nodes. However, an MBA of a leaf node may reflect the full range of data items in the node. The remainder of the tree may then be constructed as described above.

As described previously, "multi-dimensional data" can include data that is inherently multi-dimensional (e.g., geographical data) and can also include data having multiple attributes, such as sales data having characteristics including time of sale, region of sale, product sold, etc. In one embodiment of the invention multi-attribute data may be indexed in a manner different from inherently multi-dimensional data. Because of the similar manners in which these types of data may be stored, however, the following discussion may use the terms attribute and dimension interchangeably.

An existing method of indexing multi-attribute data simply consists of constructing an index on one of the attributes. Such an index, however, is inefficient for responding to a query based on a different dimension or a query based on values in two or more dimensions. For instance, a report or a query may be posed on values in both time and region attributes (i.e., a query involves a conjunction of predicates on the time and the region attributes). Having an index on just one of these two attributes does little to facilitate rapid processing of the request because the data that satisfies both predicates may be scattered within the index. Likewise, having separate indexes (e.g., one each for the time and region attributes) may also be quite slow due to the need for multiple index searches and merging of results.

A solution in one embodiment of the invention is to construct a combined index for multiple attributes of the data. In particular, an R-tree index may be generated using one or more dimensions, where each dimension represents a multi-tiered or hierarchically structured data attribute. In other words, a region dimension may comprise attributes or sub-attributes that have a hierarchical arrangement, such as State and City (i.e., every city is part of a state).

In generating such an index, data items may be clustered in a manner that facilitates relatively rapid responses to a query that matches a set of expected query patterns. Illustratively, a query pattern or a set of query patterns specifies a set of dimensions (or hierarchically structured attributes) and an expected selectivity for the query predicates on those dimensions or attribute hierarchies. By way of illustration, in the sales example above queries may always (or always be expected to) retrieve data in terms of years and cities. In this illustration two dimensions/attribute hierarchies are expressed—the first being time, for which the selectivity is yearly, and the second being region (consisting of state and city attributes), for which the selectivity is city.

Thus, if a user is likely to retrieve data based on one or more particular attributes, and/or with a particular range of values within an attribute, the R-tree can be constructed in such a manner as to respond to these queries in a very efficient and responsive manner. The possible data values for each attribute or dimension may be discrete in nature (e.g., specific dates or cities) or may be continuous (e.g., latitude and longitude). In different embodiments of the invention a user may design or specify a query pattern, select one from a number of options, or a default pattern may be assumed.

In one embodiment of the invention multiple R-tree indexes may be created from a given set or subset of multi-attribute data. Thus, if users employ multiple query patterns for the data a different index may be used to respond to different queries. The different indexes may reflect different orderings of the data dimensions, different scopes or hierarchies within a particular attribute, etc. A query analyzer or similar tool may be employed to determine which of multiple established query patterns a user's actual query most closely matches. In addition, one or more query patterns may be "learned" from a user's activity and a suitable index may then be constructed.

In storing multi-attribute data in a database, each dimension or attribute hierarchy may be stored in any of a number of different forms. For example, each dimension or attribute tier may be stored as a separate object, as a separate row in a table, its values may be stored as separate columns in a table (e.g., one column for each year, each quarter of a year, each month), etc. The range of values of a dimension may also be stored as a hierarchy, such as year, quarter, month, and day for a time dimension.

One algorithm for generating an R-tree index to store multi-attribute data in a database is provided below. In this algorithm data is separated or clustered on the basis of query retrieval units. Illustratively, a query retrieval unit represents the minimal scope or granularity (i.e., selectivity) with which data is indexed in a particular dimension, which scope is specified in the operative query pattern. For example, if the specified query pattern retrieves data for three different products (i.e., the product dimension has three values), then there are considered to be three query retrieval units in the product dimension. As another example, consider a time dimension. If the sales data reflects sales over a two-year period, we could define our query retrieval units to be years, quarters, months, etc., depending on the specified query pattern. If we choose quarters, then there would be eight query retrieval units; if we choose months, then there are twenty-four.

An illustrative algorithm for clustering multi-attribute data items for leaf nodes of an R-tree index is now provided:
1. Store all data items in a single node if possible (i.e., depending upon the fanout of the index)
2. Otherwise, until each subset or cluster of data items will fit into a single node, do:
   2.1 Select a dimension in which to divide an over-populated cluster or subset of data items:
      2.1.1 Compute the number of query retrieval units in each dimension:
         2.1.1.1 For attributes having discrete values, determine the number of possible values (e.g., number of cities for a region dimension or brand names for a product dimension)
         2.1.1.2 For attributes having a continuous range of values (e.g., latitude), a query pattern may specify a percentage, P, of the values in that domain that may be accessed in a particular query; the number of query retrieval units is then equal to (100/P)* (range of subset/range of entire set)
         2.1.1.3 Some attributes (e.g., time) may be represented by discrete values (e.g., days, months, quarters) or a continuous range; the number of query retrieval units is measured accordingly
      2.1.2 The attribute that has the most query retrieval units is selected as the dimension in which to divide the data items
   2.2 Sort the data items in the selected dimension
   2.3 Divide the data items, possibly to yield an (approximately) equal number of data items in each subset or, as one alternative, in a manner that yields a number of data subsets one or more of which will fit into individual leaf nodes
3. Repeat steps 1 and 2 until each subset fits into a single node It should be noted that for attributes having values that fall within a continuous range (e.g., latitude, longitude, possibly time) instead of being expressed as discrete values, a query pattern selected by a user or adopted for the construction of an index may specify a likely percentage of the range of attribute values. For example, if values for a latitude dimension have a total range of ten degrees, a query pattern may specify that a query (e.g., a query window) is expected to be only one-half of one degree wide. Thus, five percent of the dimension's range may be invoked during each query and the resulting number of query retrieval units in this example is twenty.

At the time that data items are to be divided in a selected dimension, different criteria may apply for selecting an optimal point of division. In general, when the dimension in which the data items are divided is marked by discrete values, the point at which the data items are divided (e.g., in Step 2.3 above) is selected to ensure a clear demarcation between items in one subset and those in another subset. When the dividing dimension is marked by continuous values, however, the selected dividing point is intended to minimize the overlap of the MBAs in the resulting index. In one embodiment of the invention data items are divided by calculating an approximate median as described earlier in this subsection. The calculated approximate median may be adjusted somewhat in order to achieve a more efficient ordering of the data items. In addition, when query retrieval units comprise intervals or ranges rather than discrete values, the center of the intervals may be used to calculate variance and for other purposes.

After leaf nodes of the index are constructed for the data items, nodes at the next higher level of the index may be generated based on the leaf nodes. In like fashion, successively higher levels of the index may be populated until a root node is put in place.

Multiple indexes can be constructed by choosing different selectivity values for a dimension or attribute hierarchy. For example, one index may be constructed to cluster on year and city granularities/selectivities (e.g., for time and region dimensions) as in an earlier example. Another index may be constructed using year and state granularities. The number of possible index structures increases as the hierarchy (e.g., number of tiers) in each dimension or attribute increases. Thus, if a county attribute is added to the region dimension then query patterns could be designed accordingly, which may affect the number of query retrieval units and the manner in which the dataset is divided. As one skilled in the art will appreciate, multiple indexes are useful in parallel evaluation of expensive OLAP (OnLine Analytical Processing) operations, such as CUBE in warehousing applications.

In one embodiment of the invention an index of multi-dimensional or multi-attribute data may also store information derived from data items, in addition to storing information concerning the data dimensions or attributes. For example, nodes of an R-tree index for sales data may store sales or profit data in addition to values for searchable attributes such as state, city, year, product, etc. Searchable attributes refer to those attributes or dimensions that may be specified as part of a search or query—such as in a WHERE clause of a SELECT statement in SQL (Structured Query Language).

The sales or profit data stored in index nodes in this example may be aggregated. In other words, a leaf node may store the combined sales or profit figures for all of its data items. The next node above that leaf node may store the aggregated sales or profit figures for all of its leaf node children, and so on. In this embodiment, only the searchable attributes (e.g., state, city, year, product) are used to form the index (i.e. to divide and cluster the data items, form MBAs). Storing the secondary data (e.g., sales, profits) in index nodes allows the rapid generation of summary reports without having to access a DATA table or individual data items.

Figure 5:
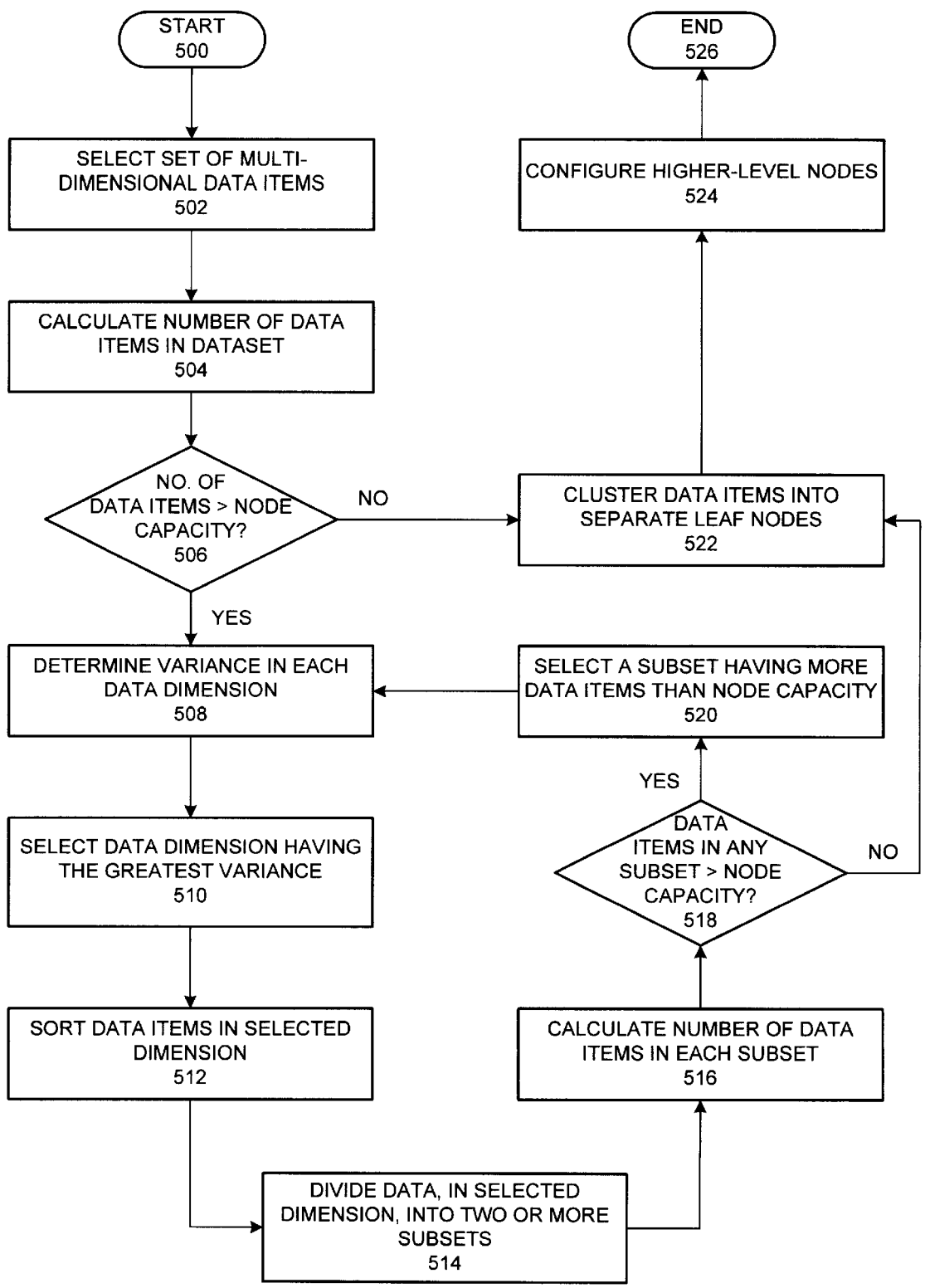
FIG. 5 is a flowchart illustrating one method of indexing a set of multi-dimensional data in accordance with an embodiment of the invention.

FIG. 5 is a flowchart illustrating one method of constructing a hierarchical index for a set of multi-dimensional data. In FIG. 5, state 500 is a start state.

In state 502, a set of multi-dimensional or multi-attribute data items is selected for indexing. In state 504 the number of data items (e.g., point data items, polygons, etc.) in the dataspace is counted or otherwise determined.

If, in state 506, it is determined that all of the data items will fit into one node (i.e., the total number of data items is no greater than the node capacity of the index), the data items are placed (e.g., associated with) one leaf node in state 522, after which the illustrated procedure continues at state 524.

Otherwise, if the number of data items in the dataspace is greater than the node capacity of the index, in state 508 the variance within each dimension or attribute (or attribute hierarchy) is determined.

In state 510 the dimension or attribute hierarchy having the greatest variance is selected and, in state 512, the data items are sorted in the selected dimension.

In state 514 the data items are divided in the selected dimension into two or more subsets. An approximate median may be computed as described above in order to divide the data items in half as nearly as possible. Alternatively, the data items may be divided into a number of clusters, each of which contains a number of data items that will fit into one leaf node.

In state 516 the number of data items in each subset is calculated to determine if any of the subset need to be further subdivided to yield clusters that will fit into leaf nodes.

If, in state 518, it is determined that none of the subsets have a greater number of data items than the node capacity of the index, the data items in each cluster/subset are placed in a separate leaf node in state 522 and the illustrated procedure proceeds to state 524.

Otherwise, if a subset has too many data items, one such subset is selected in state 520. States 508–520 are then performed repeatedly, as necessary. In this manner, the set of all data items is divided and subdivided as necessary to yield clusters of data items small enough to fit into individual leaf nodes.

In state 522, each data item is stored or associated with a leaf node. Illustratively, an entry is made in the leaf node, to contain an identifier of the data item (e.g., by Row_id) and a suitable MBA, which will closely fit the data item in one embodiment of the invention.

In state 524, the higher levels of nodes in the index (e.g., levels 2 and up) are configured. Illustratively, a node is configured at level 2 for every L leaf nodes, where $L \leq M$. In particular, nodes at level 2 and above may be formed so as to minimize the total area or volume associated with the node. Each newly configured node receives an entry for each child node, consisting of an identifier (e.g., Node_id, Row_id) and an MBA that encompasses the MBAs of each entry in the child node. State 524 finishes with the configuration of a root node. The illustrated procedure then ends at end state 526.

Inserting or Deleting a Data Item

Update operations (e.g., insertion or deletion of data) traverse an R-tree as necessary to carry out the addition or removal of a data item and ensure that the R-tree index is updated as necessary to reflect the modification. This subsection presents illustrative methods of inserting and deleting a data item in an R-tree index that is or is to be stored in a database. The data item may be any type of multi-dimensional (including multi-attribute) data.

When adding a data item in a present embodiment of the invention, an R-tree index is traversed from the root to find an appropriate leaf node in which to insert the data item. Illustratively, the choice of which branch or subtree to follow from a given node is made based upon which child node would require the smallest increase in its MBA if the new data item were added. However, if the node at the root of a selected subtree has as children leaf nodes whose MBAs overlap, then the child that is chosen to receive the data item is the one whose expanded MBA (i.e., to receive the new data item) results in the least overlap (if any). If, perchance, the new data item could be added to more than one leaf node and result in the same or nearly the same amount of overlap, then the leaf node whose MBA increases in size the least is chosen.

When a leaf node chosen to receive a new data item would exceed its capacity (i.e., M, the R-tree fanout), the node is split into two nodes by dividing the entries (i.e., the existing entries plus the new item). In one embodiment, the data items are divided in such a manner that the overlap between the nodes' MBAs and the size of their respective MBAs are minimized. A method similar to that described above for the initial partitioning of R-tree data may be applied to divide the nodes.

When a leaf node splits, ancestors of the affected node may need to be updated as well (e.g., to adjust MBAs). Thus, the split propagates upward until the old and new leaf nodes are correctly connected to the root and the MBAs of intermediate nodes are adjusted as necessary to reflect the change in the index structure and composition.

A suitable algorithm for inserting a new data item in a leaf node of an R-tree T, as an entry in the form <identifier, MBA> follows (where identifier may be a Node_id, Row_id or other identifier of the data item, and MBA is a suitable bounding area encompassing the data item):

[Step 1—Locate a leaf node for inserting the new data item]
1.1 Set insertion-node to the root of T
1.2 Initialize insertion-path (e.g., a stack) to record the path of this update operation
1.3 While insertion-node is not a leaf node, do:
   1.3.1 Compare entries in insertion-node; select the entry that would cause the least increase in its MBA area to add the data item (or the least increase in MBA overlap if insertion-node's children are leaf nodes)
   1.3.2 Push insertion-node onto insertion-path
   1.3.3 Set insertion-node to the node associated with the entry selected in Step 1.3.1
   1.3.4 Push insertion-node onto insertion-path

[Step 2—Insert data item in leaf node and update nodes on insertion-path]
2.1 Initialize insertion-entry to the new data item
2.2 Initialize modified-entry to nil (i.e., empty)
2.3 While insertion-path is not empty, do:
   2.3.1 Pop the top node in insertion-path, call it nodes
   2.3.2 Set old-MBA to the MBA of nodes
   2.3.3 If modified-entry is not empty, then:
     2.3.3.1 Identify the entry in $node_i$ whose child reference (e.g., pointer, Row_id, Node_id) matches that of modified-entry
     2.3.3.2 Replace the MBA of that entry in $node_i$ with the MBA of modified-entry
   2.3.4 If insertion-entry is not nil, then (insert it in $node_i$):
     2.3.4.1 If $node_i$ is not full (e.g., has less than M entries):
       2.3.4.1.1 Add insertion-entry to $node_i$
       2.3.4.1.2 Increment child counter of $node_i$
       2.3.4.1.3 Set insertion-entry to nil (i.e., empty)
     2.3.4.2 If $node_i$ is full:
       2.3.4.2.1 Create new node, call it $node_{ii}$
       2.3.4.2.2 Divide the entries in $node_i$, plus insertion-entry, into two subsets; store one in $node_i$ and the other in $node_{ii}$
       2.3.4.2.3 Set insertion-entry to the entry <$node_{ii}$, MBA of $node_{ii}$>
   2.3.5 Set new-MBA to the new (e.g., recalculated MBA) of nodes
   2.3.6 Compare old-MBA and new-MBA to determine if the MBA of $node_i$ changed during the update. If so, set modified-entry to <$node_i$, new MBA of $node_i$>; otherwise, set it to nil (i.e., empty)
   2.3.7 If modified-entry and insertion-entry are nil, end the algorithm (i.e., the update does not propagate to the parent of insertion-entry)

2.4 If insertion-entry and modified-entry are not nil (i.e., the root node of T has split), create a new root node with entries for these two entries and update the METADATA table accordingly Although this algorithm is configured to add a new data item to an R-tree index, one skilled in the art will appreciate how it may be modified to produce a suitable algorithm for deleting a data item.

Figure 6A:
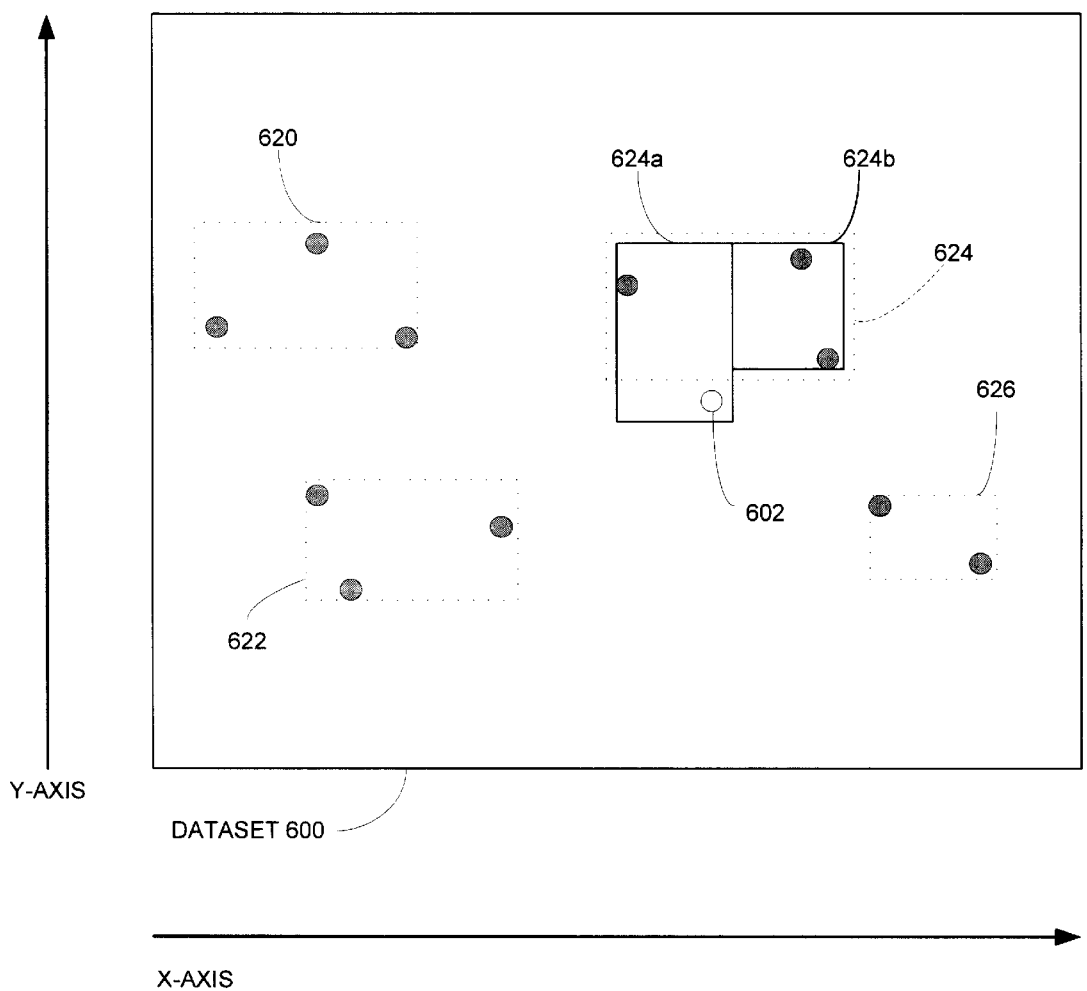
FIG. 6A depicts the addition of a data item to a set of multi-dimensional data items in accordance with an embodiment of the present invention.
Figure 6B:
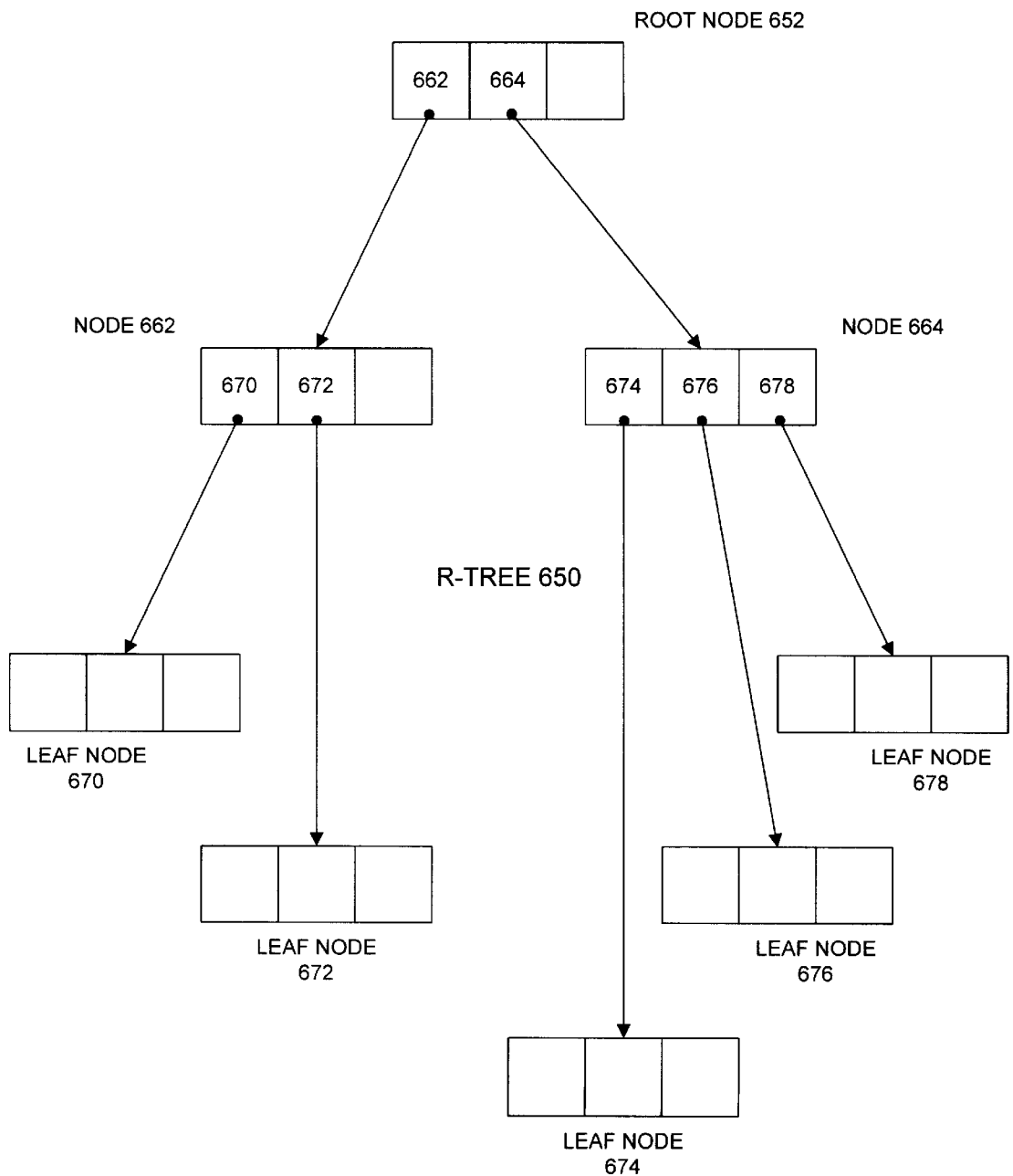
FIG. 6B depicts an R-tree index resulting from the expanded set of multi-dimensional data items of FIG. 6A in accordance with an embodiment of the present invention.

FIG. 6A depicts dataset 600, with new data item 602 that is to be added to an R-tree by applying the algorithm provided above. FIG. 6B depicts R-tree 650 resulting from the data insertion operation. The process of adding data item 602 may be described as follows.

The location phase of the algorithm commences at the root. At root node 652, the entry for node 664 is chosen for insertion because the MBA of the subtree rooted at node 664 requires the least expansion to include data item 602. At node 664, it is determined that the MBA for leaf node 674 (comprising the data items of cluster 624 before the insertion) would require less expansion than the MBA of leaf node 676 (comprising the data items of cluster 626). Thus, at the end of the location phase, the insertion path consists of node 674, node 664, and root node 652.

It should be apparent that adding an entry for data item 602 to leaf node 674 in the insertion phase of the algorithm will cause node 674 to split because it would contain more than M (i.e., three) entries. Thus, node 678 is created to accept the extra data. The data items of node 674 plus item 602 are then divided among nodes 674, 678. In particular, if the partitioning method described above is applied the data items are split along the x-axis. Cluster 624 is thus replaced by clusters 624*a*, 624*b* corresponding to nodes 674, 678, respectively.

In the second iteration of the insertion phase of the algorithm, node 664 is visited. The MBA of the entry in node 664 for leaf node 674 is modified to reflect the change in data item distribution. Also, an entry for node 678 is added to node 664. And, because the MBA of the entire subtree rooted at node 664 did not change, the algorithm ends. The end result is depicted in FIG. 6B.

The data items in the individual leaf nodes are not depicted in either FIG. 4 or FIG. 6B. As described above, in one embodiment of the invention data items are maintained in a separate DATA table, in which case each item is identified in a leaf node by its Row_id or some other suitable identifier. One difference in the leaf nodes between FIG. 4 and FIG. 6B is that in FIG. 6B leaf node 674 has been modified to include only the data items in new cluster 624*a* (vice original cluster 624) and leaf node 678 has been added for cluster 624*b*.

The processing of a deletion operation proceeds in a manner analogous to the insertion of a new data item. In particular, a deletion operation commences at the root node and propagates downward through all nodes and subtrees that intersect an MBA containing the data item to be removed. Eventually, the leaf node containing the target data item is identified and the data item is deleted.

In one embodiment of the invention a leaf node is not deleted even when the last data item within the node is removed. The MBAs of all ancestor nodes are, however, updated as necessary. In this embodiment a reorganization function is provided to restructure an R-tree for more efficient operation. Illustratively, the reorganization function identifies empty or under-filled nodes (e.g., nodes with less than 40% occupancy) and/or nodes with inefficient structure. A node may be considered to possess an inefficient structure if, for example, the area of its MBA can be substantially decreased by deleting a relatively small number of entries. If the quantity or ratio of empty and inefficient nodes meets a certain criteria (e.g., a range of approximately 5% to approximately 10% of the total number of index nodes) then the tree is restructured. In an illustrative restructuring operation empty nodes may be deleted and entries may be deleted from under-filled or inefficient nodes and re-inserted into the index. In one implementation of this embodiment other update operations on the R-tree are suspended during the reorganization function. Giving only the reorganization function the ability to update the R-tree helps prevent the index from being corrupted during the operation.

In a previous method of updating a particular type of R-tree known as an R*-tree, a data item could be forcibly inserted into a node (e.g., if the node is already full). And, when a data item was deleted from an R*-tree, its node may be deleted (if empty) or merged with another. As discussed above, however, a method of updating an R-tree in one embodiment of the present invention splits nodes instead of forcibly inserting entries and postpones treatment of empty or under-filled nodes. In addition, the previous method of updating an R*-tree was designed to work with a file-based index, not an index that has been stored in a database system.

An R-tree suitable for storage in a database management system in one embodiment of the invention may support a number of other operations, such as a window query, a nearest-neighbor query or an intersection join. These operations are discussed in the following subsections.

In one embodiment of the invention, query operations return or identify data items whose MBAs satisfy the specified query parameter(s). The degree of correlation between the query parameter(s) and the data that is returned may depend upon the type of data involved. For example, for most data that is not inherently multi-dimensional (e.g., from data warehousing applications, multi-media applications, etc.), the data identified in response to a query will likely be quite accurate even though the data items were located on the basis of their MBAs rather than their specific values. For applications such as GIS, however, the use of MBAs may limit the precision with which identified data items match a user's query. For these applications some post-query processing may be applied to determine the most appropriate results for a user in a given application or domain.

Window Query

One type of query that is supported in one embodiment of the invention is a window query. Illustratively, in a window query a user specifies a window (e.g., a set of ranges or points in each dimension, a rectangle drawn on a graphical interface) and data having a specified relationship to the window is retrieved or identified. The specified relationship is provided as a selection criterion of the user. Illustrative selection criteria include intersection, containment, enclosure and match. A window may be of virtually any size or shape.

Illustratively, a window query submitted with a criterion of "intersection" (i.e., an "intersection query") retrieves data items having MBAs that intersect the specified query window. Similarly, containment queries identify data items whose MBAs are completely contained within the query window. Conversely, enclosure queries retrieve data items whose MBAs completely enclose the query window. Finally, match queries identify data items whose MBAs match the query window (e.g., exactly or within a specifiable range of similarity).

For a given query window and set of data items or datasets, in one embodiment of the invention any data item that satisfies a match query will also satisfy an intersection, containment and enclosure query. Further, any data item that satisfies an enclosure or containment query will also satisfy an intersection query.

To answer or respond to a window query in one embodiment of the invention, a search for target data items commences at the root and propagates toward the leaf nodes in a recursive manner. Starting with the root, at each non-leaf node visited in response to the query it is determined which child nodes should be examined, depending upon the specified criterion. In a parallel processing environment multiple child nodes may be considered at once; otherwise, only one is investigated at a time and other child nodes that should be visited are marked for later examination. A stack, list or other data structure may be maintained during the processing of a query to store nodes that are to be examined.

Illustratively, if the selection criterion is either intersection or containment, query processing propagates to those child nodes/subtrees whose MBAs intersect the query window. If the selection criterion is either enclosure or match, the query propagates to those child nodes/subtrees whose MBAs enclose the query window.

At the leaf level, each data item in a visited leaf node is examined to determine if it satisfies the applicable selection criterion. Thus, while similar tests may be applied at non-leaf nodes for intersection and containment criteria and for enclosure and match criteria, at leaf nodes the query processing may differ for each criterion.

Nearest-Neighbor Query

Another type of query that may be implemented in an embodiment of the invention is a nearest-neighbor query. The purpose of this type of query is to locate the nearest data item(s) to a specified point or data value. Based on the target value or point specified by a user and the number of neighbors requested, an R-tree is searched and the appropriate data items returned to the user. For example, in a geographical application a user may specify a place of interest in order to find a desired number of the closest neighboring points.

One method of responding to a nearest-neighbor query is as follows. A priority queue (which in an alternative embodiment may be a list, stack, or other data structure) for tracking subtrees and/or data items from the R-tree is maintained; the queue is initially empty. Starting with the root node, child nodes and data items are inserted and removed from the queue as the query propagates through the index. A set of k candidate neighbors is also maintained (e.g., as array entries ordered by their distance from the query), where the value of k may be supplied by the user or may be a default value.

First, an entry is added to the queue for each child of the root node. Illustratively, entries in the queue are of the form <item, distance>, where item may be a node or a data item, depending on the height of the current node within the tree. Where the item is a node, distance is the distance from the user's point to the closest edge or perimeter of the node's MBA. Where the item is a data item, distance is the distance from the user's specified point to the data item or the closest boundary of an MBA of the data item.

The entry in the queue having the shortest distance parameter is selected for further processing. Thus, a priority queue in which entries are ordered on the basis of the distance from the entry to the query may be best suited for this purpose. If the selected entry is another node (e.g., a child node of the root), the entry is removed from the queue and replaced by entries corresponding to the child entries of that node (which may be child nodes or data items). If the selected entry is a data item, however, the data item is included in the set of candidate neighbors as long as the set contains less than k neighbors. Otherwise, if the distance from the query to the data item is less than the distance from the query to any other data items in the set, the data item replaces the candidate neighbor farthest from the query.

This process is repeated by removing entries from the queue until the farthest neighbor in the set of candidate neighbors is closer to the query than any entries in the queue. At that time, the set of candidate neighbors is returned as the set of k-nearest neighbors to the query.

As one skilled in the art will appreciate, the presently described method of finding the k nearest-neighbors accesses a minimum number of nodes for a given index. A previous algorithm, which was developed in the context of quadtrees but is also applicable to R-trees, requires space on the order of $O(n)$ for the priority queue, where n is the number of multi-dimensional data items. Advantageously, the present technique requires space for the priority queue on the order of O(number of nodes) and space for the candidate neighbors on the order of $O(k)$. Thus, because the number of nodes in an R-tree index in an embodiment of the invention can be computed by dividing the number of data items by the index's node capacity, M, the total space required is $O(k+n/M)$. As a result, this technique for finding a set of nearest-neighbors can be performed with limited memory resources and is highly scalable.

Figure 7A:
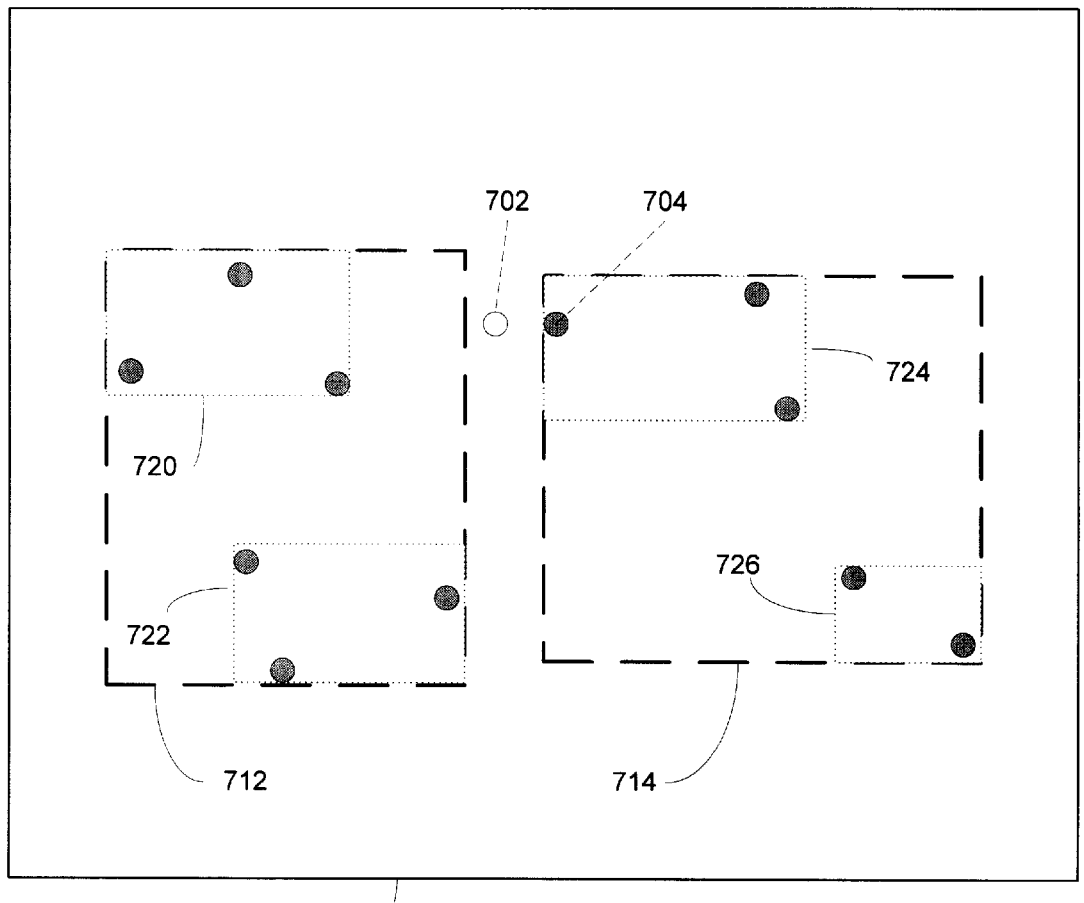
FIG. 7A depicts a nearest neighbor query in a set of multi-dimensional data items in accordance with an embodiment of the present invention.
Figure 7B:
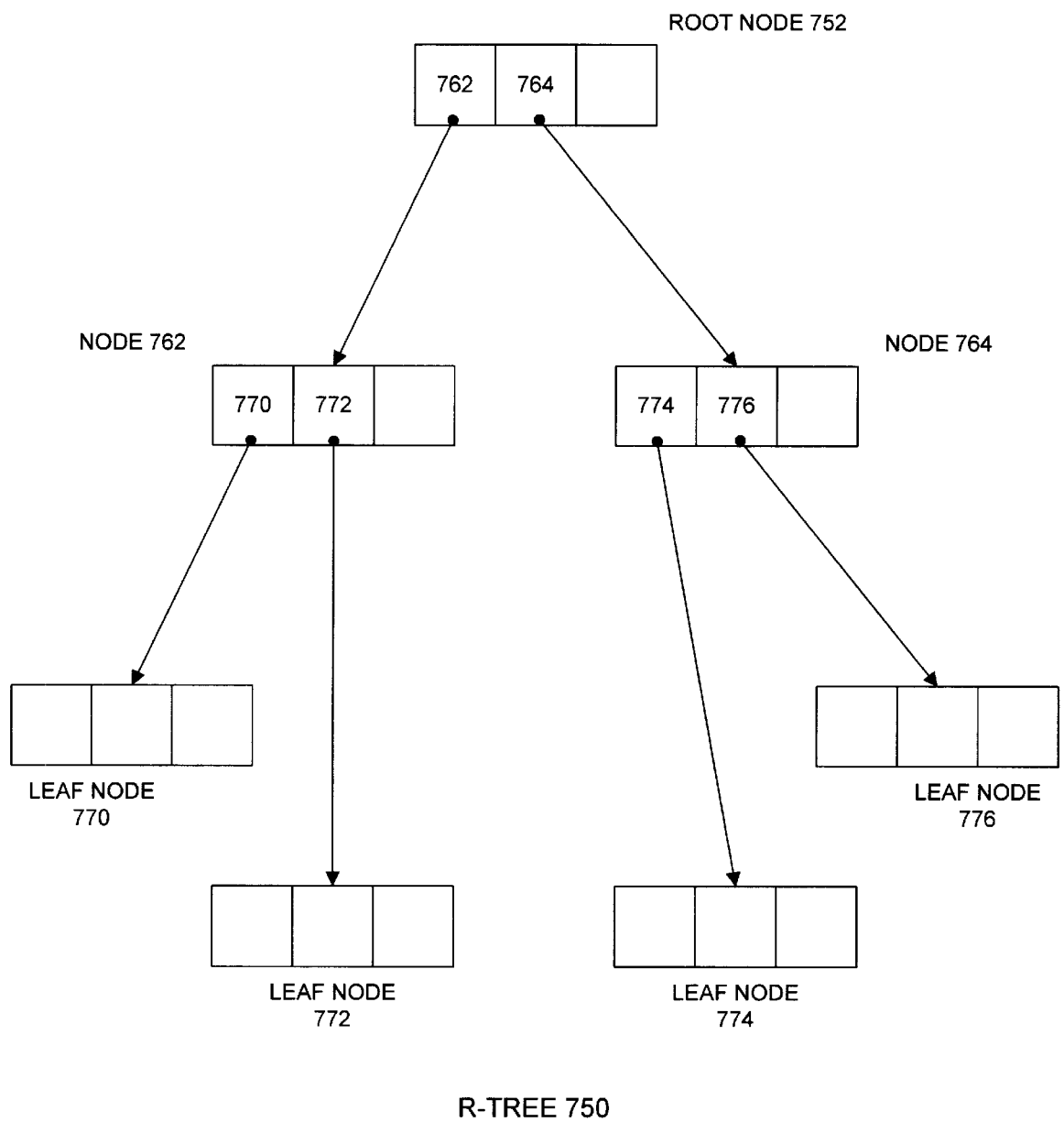
FIG. 7B illustrates one R-tree index that may be constructed from the set of multi-dimensional data items depicted in FIG. 7A in accordance with an embodiment of the present invention.

This method of finding a nearest neighbor may be illustrated with reference to FIGS. 7A–7B. In FIG. 7A, dataset 600 of FIG. 6A is used for purposes of illustration. The R-tree of FIG. 7B is one indexed representation of this dataset.

The query point for the illustrated nearest neighbor query in FIG. 7A is point 702. The MBAs of the subtrees rooted at node 762 and node 764 are depicted by boundaries 712, 714, respectively. Similarly, boundaries 720–726 represent the MBAs of leaf nodes 770–776. For the sake of brevity, it will be assumed that only the closest data item to the query point is desired (i.e., k=1).

Application of the subject method for finding a nearest neighbor begins at root node 752. Accordingly, entries for the two child nodes of the root (762, 764) are placed on the working queue: <762, distance(702, 762)> and <764, distance(702, 764)>.

Because MBA 712 of node 762, is closer to query point 702 than MBA 714 of node 764, the entry <762, distance (702, 762)>is removed from the queue. In its place are inserted entries for the leaf node children of node 762:<770, distance(702, 770)>and <, distance(702,772)>.

The queue entries are again examined and it is determined that query point 702 is closer to MBA 714 than MBA 720 (of node 770) or MBA 722 (of node 772). Thus, the entry <764, distance(702, 764)> is removed from the queue and replaced with entries for its leaf node children: <774, distance(702, 774)> and <776, distance(702, 776)>.

Of all the queue entries, the closest MBA to the query point is now MBA 724 of leaf node 774. Thus, the entry <774, distance(702, 774)> is removed from the queue and replaced with entries for each of its data items, including data item 704.

Because the distance between data item 704 and query point 702 is the shortest distance in the queue, it is returned as the nearest neighbor for the query point.

Another method of satisfying a nearest-neighbor query processes the R-tree in a depth-first manner, through the child subtree that is closest to the user's point of interest. In this process a queue or list may be maintained to track the subtrees that are circumvented as a path is traversed, which subtrees may be visited after reaching the bottom of the path.

Yet another method of responding to a nearest-neighbor query combines the previous two approaches. In particular, this approach begins at the root in a depth-first propagation pattern as in the latter of the two previous methods. Processing continues in a depth-first manner until a subtree is reached that will fit entirely within available memory (e.g., cache, RAM). That subtree is then processed using the former method. Thus, this method serves to identify a level within the R-tree at which subtrees may be processed in memory. Above that level (i.e., closer to the root) nodes are ordered first by level then by distance to the user's query point. Below the critical level, nodes are ordered using their distances to the query point.

Intersection Join

Yet another operation that may be performed with R-trees in an embodiment of the invention is a join operation. In a typical join operation, datasets indexed in separate R-trees are compared to identify areas of the datasets that overlap.

In one method of performing a join operation on datasets R and S, processing begins at the root nodes of the corresponding R-tree indexes. A pair of nodes, one from each index, is processed at a time. In processing a pair of nodes, intersecting pairs of entries of the two nodes (i.e., where the MBA of one entry from one node intersects the MBA of an entry from the other node) are identified. If the entries correspond to data items the entry pair is included as part of the join result. If only one of them is a data item, it is used as a window query (with a selection criterion of intersection) on the subtree corresponding to the other entry. A queue (or stack, list, etc.) may be maintained to store entry pairs as they are identified and until they are further processed.

Concurrency Control

In one embodiment of the invention, in which concurrent update operations may be performed on the database in which an R-tree index is stored, one or more measures may be taken to prevent corruption of the index.

For example, some operations—such as the initial construction/storage and/or reorganization of the tree—may be performed in an exclusive mode. In an exclusive mode of operation, no other update operations may be performed, thus eliminating the risk of corrupting the index.

Another measure that has already been introduced is postponing the deletion of empty nodes until an index is reorganized. This measure in large part limits the danger of distorting the index to insertion operations when a node is split. Therefore, in one embodiment of the invention the following additional safeguards are taken.

First, whenever a node, call it node 1, splits into two nodes, call them node 1 and node 1' the Node_id of node 1 before the split is assigned to node 1'. Node 1 then receives a new Node_id generated by a Node_id generator. Second, when the tree is being traversed during an update operation (e.g., addition or deletion of a data item), the node Node_id is also saved for each node that is added to the update path (e.g., insertion-path from the insertion algorithm provided above). Third, when a root node such as nodeR splits into nodeR and nodeR', a new root, nodeS, is created with entries for nodeR and nodeR'. The leftmost node of nodeR and nodeR' sets its Parent_row_id field to the Row_id of nodeS and its Parent_node_id to the Node_id of nodeS.

As a result of these safeguards, if a node splits during an update operation the split is detected and the integrity of the index is maintained. For example, in the insertion algorithm described above, each time a node is added to the insertion-path in Step 1, its Node_id value is also saved. Later, when nodes in the insertion-path are updated in Step 2 to account for MBA alterations and/or split propagations, it will be seen that a node that split will now have a different Node_id than was stored during Step 1. By tracing the Sibling field (e.g., a pointer) of the altered node, recursively if necessary, the new sibling node can be found and updated as necessary (e.g., to store the correct MBAs for its entries). In a like manner, the Parent_row_id field allows the detection of root node splits.

One embodiment of the invention may be configured for use within the extensible indexing framework of Oracle Server. Within this framework, read operations that are conducted during an index query cannot read inconsistent data because all such reads are performed on the same committed snapshot of the database. Within this extensible framework, however, index updates may read the latest committed versions of index nodes. In order to resolve any inconsistencies that may occur during the updates, a technique such as that described above may be used to detect node splits. A split of a root node, however, may be detected by tracing a pointer to a parent node (e.g., the Parent_node_id field of a node) from the erstwhile root node. Thus, a root node is not "anchored" once it is created.

Buffering During R-Tree Operations

In one embodiment of the invention, nodes of an R-tree index stored in a database may be buffered during manipulation of the index (e.g., addition or deletion of a data item, index reorganization). In particular, if the index is too large to fit into available memory space, one or more nodes of the index may be buffered in accordance with a method described in this section.

As one skilled in the art will appreciate, the performance of an R-tree index may be measured by such factors as the number of R-tree nodes that are processed or accessed in response to a query and/or the time needed to respond to a query. By buffering a portion of the index (e.g., one or more nodes) when the entire index cannot fit into memory, the response time can be greatly improved. In particular, by maintaining index nodes in memory access to them is much faster than if they remained on disk or another relatively slow storage device.

The probability of accessing a particular node of the index during a query or other operation may depend upon whether the operations are expected to be evenly distributed across the dataspace (e.g., the set of all multi-dimensional data items indexed in the R-tree) or concentrated in one or more regions of the dataspace. In addition to this factor, a buffering technique practiced in an embodiment of the invention may also consider that a parent node must be accessed before its children. Even further, the multi-dimensional nature of the data items must be taken into account (e.g., a particular data item may be retrieved on the basis of its value(s) for one or more dimensions or attributes).

When the impact of queries or other operations (e.g., the number or distribution of which nodes are accessed) is expected to be fairly uniform over a given dataspace, the probability of accessing a particular node should be proportional to the space it encompasses. Therefore, in this situation nodes may be buffered on the basis of their size, which may be measured by the amount of dataspace encompassed by its MBA (i.e., the MBA of the node's entry in its parent node) or the MBAs of all its descendant data items. Illustratively, a root node's size, since it has no parent, corresponds to the entire dataspace. Thus it will be seen that when buffering in an environment of uniform query distribution the R-tree's root node will be the first node buffered, which is logical since many operations on an index begin at the root.

In addition to the root node, a successive number of nodes may be buffered—based on their sizes—until the buffer can hold no more nodes. Typically, this method will result in the upper portions of the R-tree being buffered. If, however, the next node to be buffered is too large for the buffer, in order to make the best use of the buffer space a smaller node may be stored.

This method of buffering nodes for uniform query distributions may be extended to make it suitable for situations in which the distribution of queries is concentrated in one or more regions of the dataspace. In particular, in one embodiment of the invention statistics are collected concerning access to individual nodes, data items or clusters of data items. Maintaining such statistics facilitates the determination of which nodes or regions are accessed most frequently.

Then, based on the collected access statistics, the most frequently accessed nodes may be buffered first. Because one particular data item or set of data items may be accessed in a large proportion of queries or other buffered operations, the nodes that are buffered from the index may form a path toward those items. When two or more nodes have been accessed with equal or near equal frequency and one must be chosen for buffering, the determination of which node to buffer may be made on the basis of which node is associated with a larger MBA or has more data items in its subtree.

The composition of a buffer may therefore change over time. If the focus of users' queries changes from one portion of an index to another, the buffered nodes may gradually change from one set to another set. Likewise if query operations change from being relatively uniform in distribution to being concentrated in a region.

In one embodiment of the invention the frequency with which a particular node is accessed is tracked by one or more counters. For example, a separate counter may be associated with each node of the R-tree, each cluster of data items, etc. The counters may be initialized or re-initialized when the database is started, when the index is re-organized or updated, at specified or programmable intervals, etc.

The foregoing descriptions of embodiments of the invention have been presented for purposes of illustration and description only. They are not intended to be exhaustive or to limit the invention to the forms disclosed. Many modifications and variations will be apparent to practitioners skilled in the art. Accordingly, the above disclosure is not intended to limit the invention; the scope of the invention is defined by the appended claims.

What is claimed is:

1. A computer readable storage medium storing instructions that, when executed by a computer, cause the computer to perform a method of constructing a hierarchical index from a set of multi-dimensional data, the method comprising:
   (a) calculating a number of members of a set of multi-dimensional data items;
   (b) determining whether said number of members exceeds a node capacity of a hierarchical index configured to index said data items;
   (c) determining a variance of values in one or more dimensions of said data items;
   (d) identifying a first dimension of said one or more multi dimensions in which to divide said set of multi-dimensional data items;
   (e) sorting said data items in said first dimension;
   (f) dividing said sorted data items in said first dimension into two or more subsets by:
      (f') determining whether said number of members is less than double said node capacity; and
      (f") calculating the floor of the quotient of said node capacity divided by two;
   (g) repeating (a)–(f) for each said subset in order to divide said set of data items into a plurality of data item clusters, wherein each cluster comprises a number of data items no greater than said node capacity; and
   (h) configuring a leaf node of said hierarchical index for data items in a first cluster.

2. A computer-implemented method of constructing a hierarchical index from a set of multi-dimensional data, comprising:
   (a) calculating a number of members of a set of multi-dimensional data items;
   (b) determining whether said number of members exceeds a node capacity of a hierarchical index configured to index said data items;
   (c) determining a variance of values in one or more dimensions of said data items;
   (d) identifying a first dimension of said one or more multi dimensions in which to divide said set of multi-dimensional data items;
   (e) sorting said data items in said first dimension;
   (f) dividing said sorted data items in said first dimension into two or more subsets by:
      (f') determining whether said number of members is less than double said node capacity; and
      (f") calculating the floor of the quotient of said node capacity divided by two;
   (g) repeating (a)–(f) for each said subset in order to divide said set of data items into a plurality of data item clusters, wherein each cluster comprises a number of data items no greater than said node capacity; and
   (h) configuring a leaf node of said hierarchical index for data items in a first cluster.

3. The computer-implemented method of claim 2, wherein said identifying comprises selecting a dimension, from said one or more dimensions, having the greatest variance of values.

4. The computer-implemented method of claim 2, in which said configuring comprises:
   creating a first leaf node of the index; and
   inserting an entry in said first leaf node for each data item in a first subset of said set of multi-dimensional data items, wherein a first entry for a first data item comprises:
      an identifier of said first data item; and
      a bounding area encompassing said first data item.

5. The computer-implemented method of claim 2, wherein the dimensions of said multi-dimensional data are inherently related.

6. The computer-implemented method of claim 2, wherein the dimensions of the multi-dimensional data are independent attributes.

7. The computer-implemented method of claim 2, further comprising identifying a query pattern for retrieving one or more data items from said set of data items, wherein said query pattern comprises a hierarchy of two or more dimensions of said multi-dimensional data items.

8. The computer-implemented method of claim 7, which said identifying comprises selecting a dimension in said hierarchy of two or more dimensions.

9. A computer readable storage medium storing instructions that, when executed by a computer, cause the computer to perform a method of constructing a hierarchical index from a set of multi-dimensional data, the method comprising:
   (a) calculating a number of members of a set of multi-dimensional data items;

(b) determining whether said number of members exceeds a node capacity of a hierarchical index configured to index said data items;

(c) determining a variance of values in one or more dimensions of said data items;

(d) identifying a first dimension of said one or more multi dimensions in which to divide said set of multi-dimensional data items;

(e) sorting said data items in said first dimension;

(f) dividing said sorted data items in said first dimension into two or more subsets by:

(f') determining whether said number of members is greater than or equal to double said node capacity; and (f") calculating the value of said node capacity times (the floor of (the sum of 0.5 plus (the quotient of said number of members divided by twice said node capacity)));

(g) repeating (a)–(f) for each said subset in order to divide said set of data items into a plurality of data item clusters, wherein each cluster comprises a number of data items no greater than said node capacity; and (h) configuring a leaf node of said hierarchical index for data items in a first cluster.

10. A computer-implemented method of constructing a hierarchical index from a set of multi-dimensional data, comprising:

(a) calculating a number of members of a set of multi-dimensional data items;

(b) determining whether said number of members exceeds a node capacity of a hierarchical index configured to index said data items;

(c) determining a variance of values in one or more dimensions of said data items;

(d) identifying a first dimension of said one or more multi dimensions in which to divide said set of multi-dimensional data items;

(e) sorting said data items in said first dimension;

(f) dividing said sorted data items in said first dimension into two or more subsets by:

(f') determining whether said number of members is greater than or equal to double said node capacity; and (f") calculating the value of said node capacity times (the floor of (the sum of 0.5 plus (the quotient of said number of members divided by twice said node capacity)));

(g) repeating (a)–(f) for each said subset in order to divide said set of data items into a plurality of data item clusters, wherein each cluster comprises a number of data items no greater than said node capacity; and (h) configuring a leaf node of said hierarchical index for data items in a first cluster.

11. The computer-implemented method of claim 10, wherein said identifying comprises selecting a dimension, from said one or more dimensions, having the greatest variance of values.

12. The computer-implemented method of claim 10, in which said configuring comprises:

creating a first leaf node of the index; and inserting an entry in said first leaf node for each data item in a first subset of said set of multi-dimensional data items, wherein a first entry for a first data item comprises:

an identifier of said first data item; and a bounding area encompassing said first data item.

13. The computer-implemented method of claim 10, wherein the dimensions of said multi-dimensional data are inherently related.

14. The computer-implemented method of claim 10, wherein the dimensions of the multi-dimensional data are independent attributes.

15. The computer-implemented method of claim 10, further comprising identifying a query pattern for retrieving one or more data items from said set of data items, wherein said query pattern comprises a hierarchy of two or more dimensions of said multi-dimensional data items.

16. The computer-implemented method of claim 15, in which said identifying comprises selecting a dimension in said hierarchy of two or more dimensions.

17. A computer readable storage medium storing instructions that, when executed by a computer, cause the computer to perform a method of indexing a set of multi-dimensional data items, the method comprising:

sorting a set of multi-dimensional data items in a first dimension, said first dimension corresponding to a primary dimension of a first query pattern;

dividing said sorted set of multi-dimensional data items in said first dimension into two or more first-order subsets of multi-dimensional data items;

sorting a first first-order subset of said two or more first-order subsets of multi-dimensional data items in a second dimension, said second dimension corresponding to a secondary dimension of said first query pattern;

dividing said first first-order subset of multi-dimensional data items in said second dimension into two or more second-order subsets of multi-dimensional data items; and storing the members of an N-order subset of multi-dimensional data items in a leaf node of a hierarchical index, wherein the number of data items in said N-order subset is less than or equal to a node capacity of said hierarchical index and N is greater than or equal to two.

18. A computer-implemented method of indexing a set of multi-dimensional data items, comprising:

sorting a set of multi-dimensional data items in a first dimension, said first dimension corresponding to a primary dimension of a first query pattern;

dividing said sorted set of multi-dimensional data items in said first dimension into two or more first-order subsets of multi-dimensional data items;

sorting a first first-order subset of said two or more first-order subsets of multi-dimensional data items in a second dimension, said second dimension corresponding to a secondary dimension of said first query pattern;

dividing said first first-order subset of multi-dimensional data items in said second dimension into two or more second-order subsets of multi-dimensional data items; and storing the members of an N-order subset of multi-dimensional data items in a leaf node of a hierarchical index, wherein the number of data items in said N-order subset is less than or equal to a node capacity of said hierarchical index and N is greater than or equal to two.

19. The method of claim 18, wherein said first dimension is a hierarchical attribute of said data items.

20. The method of claim 18, further comprising storing said leaf node in a relational database.

21. The method of claim 18, wherein said sorting a set of multi-dimensional data items comprises:

determining a variance of said multi-dimensional data items in one or more dimensions of said multi-dimensional data items; and selecting a first dimension of said multi-dimensional data items having a greater variance than a second dimension of said multi-dimensional data items.

22. The method of claim 18, in which said dividing said sorted set of multi-dimensional data items in said first dimension comprises:

determining the number of data items in said set of multi-dimensional data items;

calculating an intermediate value in said first dimension; and selecting a first data item corresponding to said intermediate value.

23. The method of claim 22, wherein said intermediate value is an approximate median value.

24. The method of claim 22, in which said calculating an intermediate value comprises:

determining whether said number of data items is less than twice the capacity of a node of said hierarchical index; and calculating the floor of the quotient of said node capacity divided by two.

25. The method of claim 22, in which said calculating an intermediate value comprises:

determining whether said number of data items is greater than or equal to twice the capacity of a node of said hierarchical index; and calculating the value of said node capacity multiplied by (the floor of (the sum of 0.5 plus (the quotient of said number of data items divided by twice said node capacity))).

26. The computer-implemented method of claim 18, further comprising:

storing an identifier of a root node of said hierarchical index;

storing a node capacity of said hierarchical index; and storing a measure of the dimensionality of said multi-dimensional data items.

27. The computer-implemented method of claim 18, wherein said storing the members of an N-order subset of multi-dimensional data items comprises:

creating a first leaf node of said hierarchical index; and inserting an entry in said first leaf node for each said member of said N-order subset of multi-dimensional data items, wherein each said entry comprises:
an identifier of said corresponding member; and
a bounding area encompassing said corresponding member.

* * * * *